United States Patent
Kolingivadi et al.

(10) Patent No.: US 11,374,970 B2
(45) Date of Patent: Jun. 28, 2022

(54) PHISHING ATTEMPT CATEGORIZATION/AGGREGATION INTERFACE

(71) Applicant: ServiceNow, Inc., Santa Clara, CA (US)

(72) Inventors: Deepakeswaran Sundaragopal Kolingivadi, Dublin, CA (US); Santosh Reddy Poreddy, Dublin, CA (US); Sachin Shivarama Nayak, Santa Clara, CA (US); Farid Firoz Merchant, Sunnyvale, CA (US); Apoorv Mehta, Sunnyvale, CA (US)

(73) Assignee: ServiceNow, Inc., Santa Clara, CA (US)

( * ) Notice: Subject to any disclaimer, the term of this patent is extended or adjusted under 35 U.S.C. 154(b) by 251 days.

(21) Appl. No.: 16/712,359

(22) Filed: Dec. 12, 2019

(65) Prior Publication Data
US 2020/0358820 A1 Nov. 12, 2020

Related U.S. Application Data

(60) Provisional application No. 62/844,653, filed on May 7, 2019.

(51) Int. Cl.
*H04L 9/40* (2022.01)
*H04L 41/22* (2022.01)
*H04L 51/00* (2022.01)

(52) U.S. Cl.
CPC .......... *H04L 63/1483* (2013.01); *H04L 41/22* (2013.01); *H04L 51/12* (2013.01); *H04L 63/1416* (2013.01); *H04L 63/1425* (2013.01); *H04L 63/1433* (2013.01); *H04L 63/20* (2013.01)

(58) Field of Classification Search
CPC . H04L 63/20; H04L 63/1416; H04L 63/1425; H04L 63/1433; H04L 63/1483; H04L 41/22; H04L 51/12
See application file for complete search history.

(56) References Cited

U.S. PATENT DOCUMENTS

| 6,609,122 | B1 | 8/2003 | Ensor |
| 7,028,301 | B2 | 4/2006 | Ding |
| 7,062,683 | B2 | 6/2006 | Warpenburg |

(Continued)

FOREIGN PATENT DOCUMENTS

WO WO-2016164844 A1 * 10/2016 ............. H04L 51/00

OTHER PUBLICATIONS

Frøystad, Christian. "Exchange of Security Incident Information in the context of Cloud Services." (Year: 2015).*

(Continued)

*Primary Examiner* — John M Macilwinen
(74) *Attorney, Agent, or Firm* — Fletcher Yoder PC

(57) ABSTRACT

Systems, methods, and media are used to identify phishing attacks. A notification of a phishing attempt with a parameter associated with a recipient of the phishing attempt is received at a security management node. In response, an indication of the phishing attempt is presented in a phishing attempt search interface. The reported phishing attempts may be aggregated based upon specified criteria to avoid redundant incidents that may hinder remediation efforts.

20 Claims, 22 Drawing Sheets

(56) References Cited

U.S. PATENT DOCUMENTS

| | | |
|---|---|---|
| 7,131,037 B1 | 10/2006 | LeFaive |
| 7,170,864 B2 | 1/2007 | Matharu |
| 7,610,512 B2 | 10/2009 | Gerber |
| 7,617,073 B2 | 11/2009 | Trinon |
| 7,689,628 B2 | 3/2010 | Garg |
| 7,783,744 B2 | 8/2010 | Garg |
| 7,890,802 B2 | 2/2011 | Gerber |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,224,683 B2 | 7/2012 | Manos |
| 8,266,096 B2 | 9/2012 | Navarrete |
| 8,457,928 B2 | 6/2013 | Dang |
| 8,478,569 B2 | 7/2013 | Scarpelli |
| 8,674,992 B2 | 3/2014 | Poston |
| 8,689,241 B2 | 4/2014 | Naik |
| 8,743,121 B2 | 6/2014 | De Peuter |
| 8,832,652 B2 | 9/2014 | Mueller |
| 8,887,133 B2 | 11/2014 | Behnia |
| 9,239,857 B2 | 1/2016 | Trinon |
| 9,363,252 B2 | 6/2016 | Mueller |
| 9,535,737 B2 | 1/2017 | Joy |
| 9,645,833 B2 | 5/2017 | Mueller |
| 9,792,387 B2 | 10/2017 | George |
| 10,158,677 B1* | 12/2018 | DiCorpo ............ H04L 63/1483 |
| 10,375,093 B1* | 8/2019 | Higbee ................ G06F 21/554 |
| 2016/0226904 A1* | 8/2016 | Bartos .................. G06F 21/566 |
| 2017/0366582 A1* | 12/2017 | Kothekar ............. H04L 63/101 |
| 2019/0268354 A1 | 8/2019 | Zettel, II et al. |
| 2020/0092325 A1* | 3/2020 | Kolingivadi ............ H04L 51/12 |

OTHER PUBLICATIONS

Silva, David et al. "Hierarchical Incident Clustering for Security Operation Centers." (Year: 2018).*

U.S. Appl. No. 16/132,890, filed Sep. 17, 2018, Deepakeswaran Sundaragopal Kolingivadi.

* cited by examiner

≡ INGESTION RULE  — 2000

[UPDATE] [SAVE]

* RULE NAME [WINTER PHISHING CAMPAIGN] — 2010

* RULE OUTCOME ⊙ CREATE INCIDENT ▶ — 2004
  — 2006

CONDITION [ADD FILTER CONDITION] [ADD "OR" CLAUSE] — 2008

2002 { [SENDER ▶] [IS ▶] [PHISHER@PHISHER.COM]
      [SUBJECT ▶] [CONTAINS ▶] [INVOICE: INVEESION]

☑ ACTIVE — 2012

* ORDER [50] — 2016

* INCIDENT TEMPLATE [WOMBAT INCIDENT TEMPLATE ▶] — 2014

[UPDATE] [SAVE]

*FIG. 18*

≡ ∨ AGGREGATION RULE | UPDATE | SAVE |

* RULE NAME | WINTER PHISHING CAMPAIGN | ⎯ 2056

* RULE OUTCOME ⊙ CREATE CHILD INCIDENT ▶ ⎯ 2054

CONDITION | ADD FILTER CONDITION | ADD "OR" CLAUSE |

⎰ EMAIL SUBJECT ▶ | CONTAINS ▶ | INVEESION: INVOICE |
2052 ⎱ SENDER ▶ | IS ▶ | PHISHER@PHISHER.COM |

☑ ACTIVE

* ORDER | 50 | ⎯ 2058

* INCIDENT TEMPLATE | WOMBAT CHILD INCIDENT TEMPLATE ▶ ⎯ 2060

| UPDATE | SAVE |

| AGGREGATION RULE  NEW  EDIT | | |
|---|---|---|
| ▽ ALL ▸ | | |
| MATCHING RULE NAME ◂ | ORDER | CREATED BY | ACTIVE |
| WINTER PHISHING CAMPAIGN | 50 | SOC MANAGER | TRUE |
| PHISHING | 100 | SECURITY ADMIN | TRUE |
| ZOOM MALWARE TEST | 150 | SOC MANAGER | TRUE |
| MALWARE | 200 | SECURITY ADMIN | TRUE |
| DENIAL OF SERVICE | 300 | SECURITY ADMIN | TRUE |
| INSIDER THREAT | 400 | SECURITY ADMIN | TRUE |
| SUMMER PHISHING CAMPAIGN | 5000 | SOC MANAGER | FALSE |

SECURITY INCIDENT — UPDATE | SAVE — 3050

- NUMBER: SIR0001106 — 3052
- CONFIGURATION ITEM: nv8500NBX08 — 3054
- PRIORITY: 2 - HIGH — 3056
- BUSINESS IMPACT: 1 - CRITICAL — 3058
- EMAIL: EML00012378 — 3060
- SHORT: SIMULATED PHISHING DURING WINTER 2018
- CATEGORY: PHISHING — 3062
- SUBCATEGORY: SIMULATED PHISHING — 3064
- RISK SCORE: 85 — 3066
- ASSIGNED TO: JOHN JOHNSON — 3068

— 3070

UPDATE | SAVE

PHISHING EMAIL (3) | AFFECTED USERS (3) | OBSERVABLES (10)
— 3074 — 3076 — 3078

PHISHING EMAIL — NEW | EDIT

▼ ALL ▶

| EMAIL | SUBJECT |
|---|---|
| EML00012378 | INVEESION: INVOICE |
| EML00012379 | INVEESION: INVOICE |
| EML00012380 | INVEESION: INVOICE |

— 3072

| INCIDENT NUMBER | INCIDENT TYPE |
|---|---|
| SIR0001106 | PARENT |
| SIR0001107 | CHILD |
| SIR0001108 | CHILD |

| HEADER | Received: from BN7PR08MB5106.namprd08.prod.outlook.com (2603:10b6:102.2::31) by BYAPR08MB5109.namprd08.prod.outlook.com with HTTPS via CO2PR05CA0063.NAMPRD05.PROD.OUTLOOK.COM. Mon. 8 Oct 2018 20:45:59 +0000<br>Received: from CY4PR08CA0025.namprd08.prod.outlook.com (2603:10b6:903:151::11) by BN7PR08MB5106.namprd08.prod.outlook.com (2603:10b6:408:21:33) with Microsoft SMTP Server (version=TLS1_2, cipher=TLS_ECDHE_RSA_WITH_AES_256_GCM_SHA384) id 15.20.1207.28; Mon. 8 Oct 2018 20:45:53 +0000<br>Received: from DM3NAM03FT050.eop-NAM03.prod.protection.outlook.com (2a01:111:f400:7e49::209) by CY4PR08CA0025.outlook.com (2603:10b6:903:151::11) with Microsoft SMTP Server (version=TLS1_2, cipher= TLS_ECDHE_RSA_WITH_AES_256_CBC_SHA384) id 15.20.1207.18 via Frontend Transport, Mon, 8 Oct 2018 20:45:53 +0000 |
|---|---|

EMAIL HEADER

≡ EMAIL HEADER

▽ ALL ▲

| HEADER NAME | HEADER VALUE |
|---|---|
| X - HEADER | SED UT PERSPICIATIS UNDE OMNIS ISTE NATUS ERROR SIT VOLUPTATEM ACCUSATIOUM DOLOREMQUE LAUDANTIUM |
| AUTHENTICATION RESULTS | LOREM 1PSUM |
| RECEIVED - SPF | ISTE NATUS ERROR SIT VOLUPT |

PHISHING ATTEMPT CATEGORIZATION/AGGREGATION INTERFACE

CROSS-REFERENCE TO RELATED APPLICATIONS

This application claims priority from and the benefit of U.S. Provisional Application Ser. No. 62/844,653, entitled "PHISHING ATTEMPT CATEGORIZATION/AGGREGATION INTERFACE", filed May 7, 2019, which is hereby incorporated by reference in its entirety for all purposes.

BACKGROUND

The present disclosure relates generally to performing searches in response to phishing attacks.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Furthermore, the IT infrastructure solutions via cloud computing may provide IT functionality for security of networks or client devices monitored by the IT infrastructure solutions. However, these devices may be controlled by numerous different users having different levels of technological understanding. Additionally, the users may be targeted for phishing attacks. Phishing attacks are fraudulently sent emails purporting to be from a reputable sender in order to induce the targeted users to reveal information, such as secured data, passwords and credit card numbers. Successful phishing attacks may render the networks or client devices monitored by the PaaS vulnerable. Successful phishing attacks may also cause other users to become vulnerable. However, in the context of potentially large and distributed IT networks, it may be difficult to identify the presence and timing of a phishing attacks within the IT networks.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Systems, methods, and media described herein are used to identify phishing attacks. A notification of a phishing attempt with a parameter associated with a recipient of the phishing attempt is received at a security management node. In response, an indication of the phishing attempt is presented in a phishing attempt search interface. The phishing attempt search interface may be used to search for additional recipients of the attack, identify which recipients have been successfully targeted, and provide a summary of the recipients. Using this information, appropriate security measures in response to the phishing attempt may be performed.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 18 is a graphical user interface that illustrates categorization/consolidation criteria for a new incoming phishing submission, in accordance with aspects of the present disclosure;

FIG. 19 is a graphical user interface that illustrates consolidation criteria for incoming phishing submissions that match a previously created incident, in accordance with aspects of the present disclosure;

FIG. 20 is a graphical user interface that illustrates a set of prioritized aggregation rules for received phishing submissions, in accordance with aspects of the present disclosure;

FIG. 21 is a graphical user interface that illustrates a consolidated set of phishing submissions that are consolidated into a single incident, in accordance with aspects of the present disclosure; and FIGS. 22 and 23 are graphical user interfaces that provide e-mail details associated with the phishing attempt, in accordance with aspects of the present disclosure.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

Computer networks may be subject to phishing attacks. Furthermore, these attacks may include multiple messages sent as part of a campaign to infiltrate the computer networks. As the size of the networks and/or number of users grow, the networks may become more vulnerable due to additional points of potential entry. Furthermore, larger networks may make it difficult to identify and correlate coordinated campaigns. To address these issues a phishing attempt search interface may be used to identify phishing attacks. A notification of a phishing attempt with a parameter associated with a recipient of the phishing attempt is received at a security management node. In response, an indication of the phishing attempt is presented in a phishing attempt search interface. The phishing attempt search interface may be used to search for additional recipients, identify which recipients have been successfully targeted, and provide a summary of the recipients. Using this information, appropriate security measures in response to the phishing attempt for the recipients may be performed.

Figure 1:
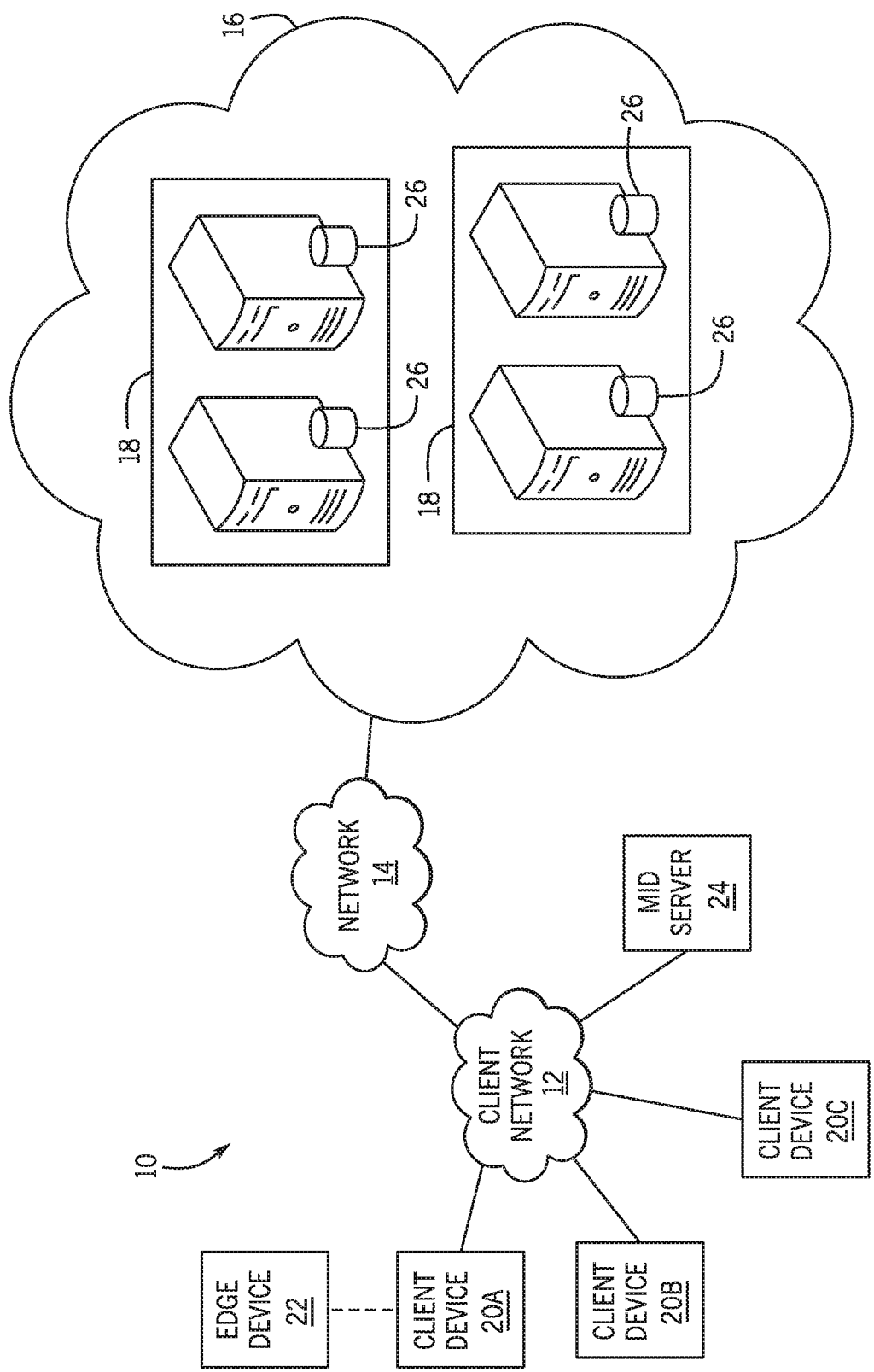
FIG. 1 is a block diagram of an embodiment of a cloud architecture in which embodiments of the present disclosure may operate.

With the preceding in mind, the following figures relate to various types of generalized system architectures or configurations that may be employed to provide services to an organization in a networked or cloud-based framework (e.g., a multi-instance framework) and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. The computing system 10 may include a client network 12, a network 14 (e.g., the Internet), and a cloud-based platform 16. In some implementations, the cloud-based platform 16 may be a security operations (Sec Ops) platform that may be used to track and/or report incidents in the client network 12 and/or connected devices. In some embodiments, the Sec Ops platform may utilize a security information and event management (SIEM) platform to manage security of the client network by logging potential issues, logging specified information, generate alerts, instruct other security controls to stop an activity, and/or other security operations.

In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. In some embodiments, the MID server 24 may be implemented using software on one or more of the client devices 20. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), Institute of Electrical and Electronics Engineers (IEEE) 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and/or execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
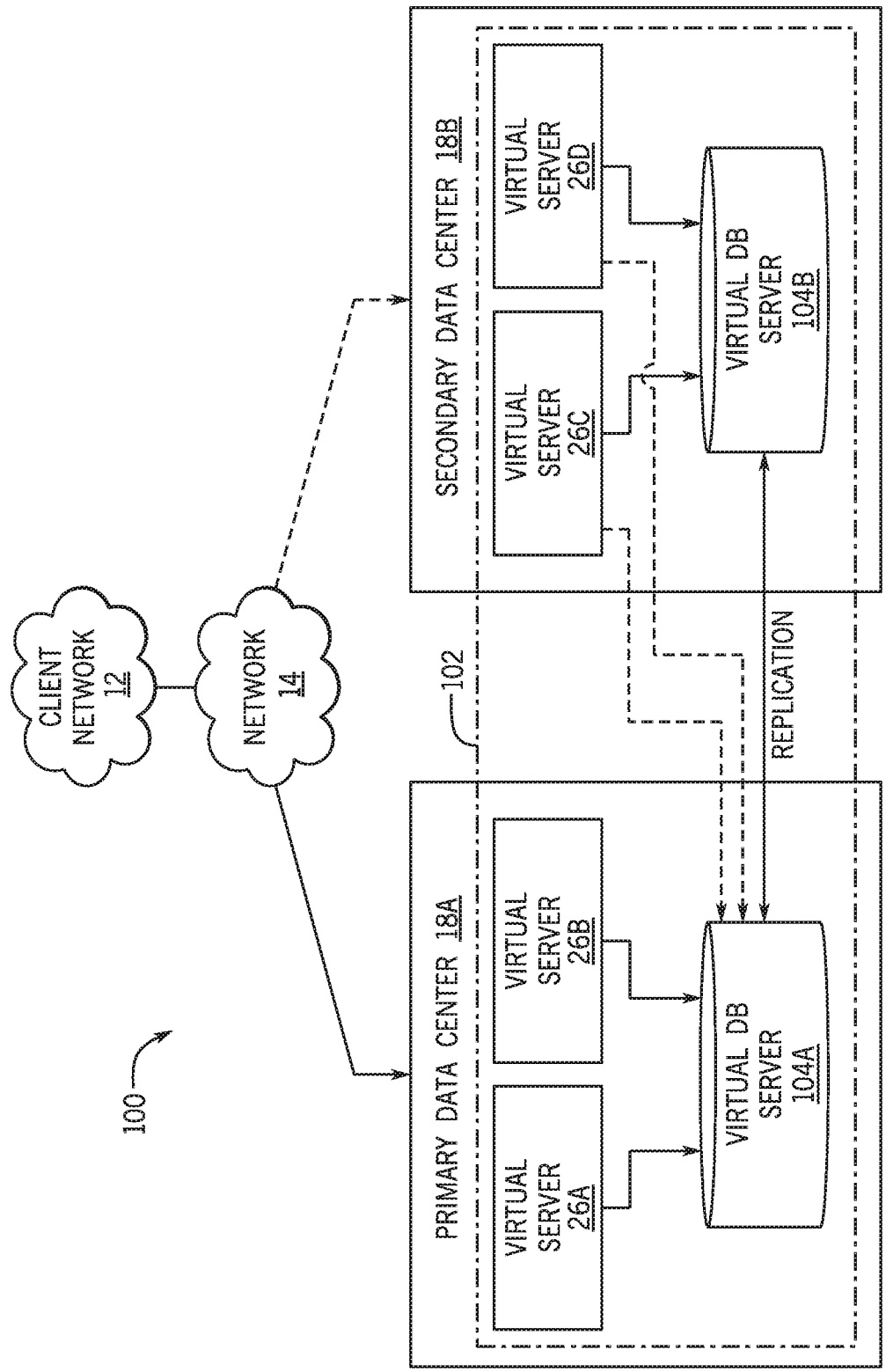
FIG. 2 is a schematic diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers 26 (e.g., virtual servers 26A, 26B, 26C, and 26D) and dedicated database servers (e.g., virtual database servers 104A and 104B). Stated another way, the virtual servers 26A, 26B, 26C, 26D and virtual database servers 104A, 104B are not shared with other client instances but are specific to the respective client instance 102. Other embodiments of the multi-instance cloud architecture 100 could include other types of dedicated virtual servers, such as a web server. For example, the client instance 102 could be associated with (e.g., supported and enabled by) the dedicated virtual servers 26A, 26B, 26C, 26D, dedicated virtual database servers 104A, 104B, and additional dedicated virtual web servers (not shown in FIG. 2).

In the depicted example, to facilitate availability of the client instance 102, the virtual servers 26A, 26B, 26C, 26D and virtual database servers 104A, 104B are allocated to two different data centers 18A, 18B, where one of the data centers 18 acts as a backup data center 18. In reference to FIG. 2, data center 18A acts as a primary data center 18A that includes a primary pair of virtual servers 26A, 26B and the primary virtual database server 104A associated with the client instance 102, and data center 18B acts as a secondary data center 18B to back up the primary data center 18A for the client instance 102. To back up the primary data center 18A for the client instance 102, the secondary data center 18B includes a secondary pair of virtual servers 26C, 26D and a secondary virtual database server 104B. The primary virtual database server 104A is able to replicate data to the secondary virtual database server 104B (e.g., via the network 14).

As shown in FIG. 2, the primary virtual database server 104A may backup data to the secondary virtual database server 104B using a database replication operation. The replication of data between data could be implemented by performing full backups weekly and daily incremental backups in both data centers 18A, 18B. Having both a primary data center 18A and secondary data center 18B allows data traffic that typically travels to the primary data center 18A for the client instance 102 to be diverted to the second data center 18B during a failure and/or maintenance scenario. Using FIG. 2 as an example, if the virtual servers 26A, 26B and/or primary virtual database server 104A fails and/or is under maintenance, data traffic for client instances 102 can be diverted to the secondary virtual servers 26C, 26D and the secondary virtual database server instance 104B for processing.

Although FIGS. 1 and 2 illustrate specific embodiments of a computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
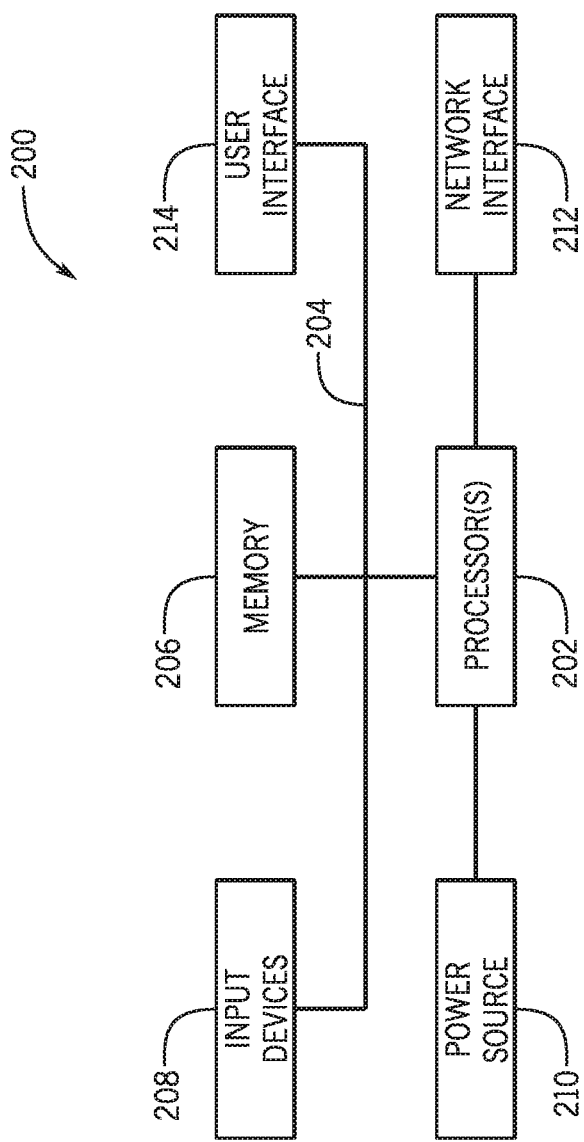
FIG. 3 is a block diagram of a computing device utilized in a computing system that may be present in FIG. 1 or 2, in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing system 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
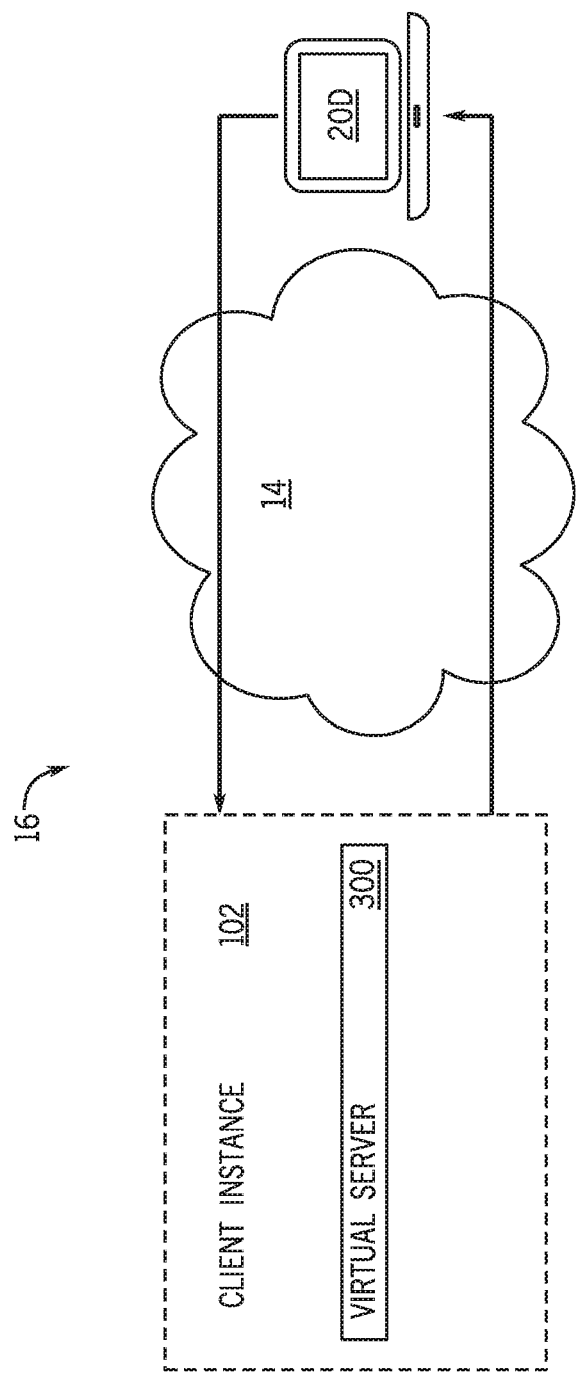
FIG. 4 is a block diagram illustrating an embodiment in which a virtual server supports and enables the client instance, in accordance with aspects of the present disclosure.

With the preceding in mind, FIG. 4 is a block diagram illustrating an embodiment in which a virtual server 300 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20D via the network 14 to provide a user interface to network applications executing within the client instance 102 (e.g., via a web browser of the client device 20D). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device 20D, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

As previously discussed, the application may be executed to perform security operations as part of an IT support bundle for the client network 12 via the Sec Ops and SIEM. The IT support bundle may include a phishing attempt searching interface. Alternatively, the phishing attempt searching interface may be provided independently apart from the IT support bundle.

Figure 5:
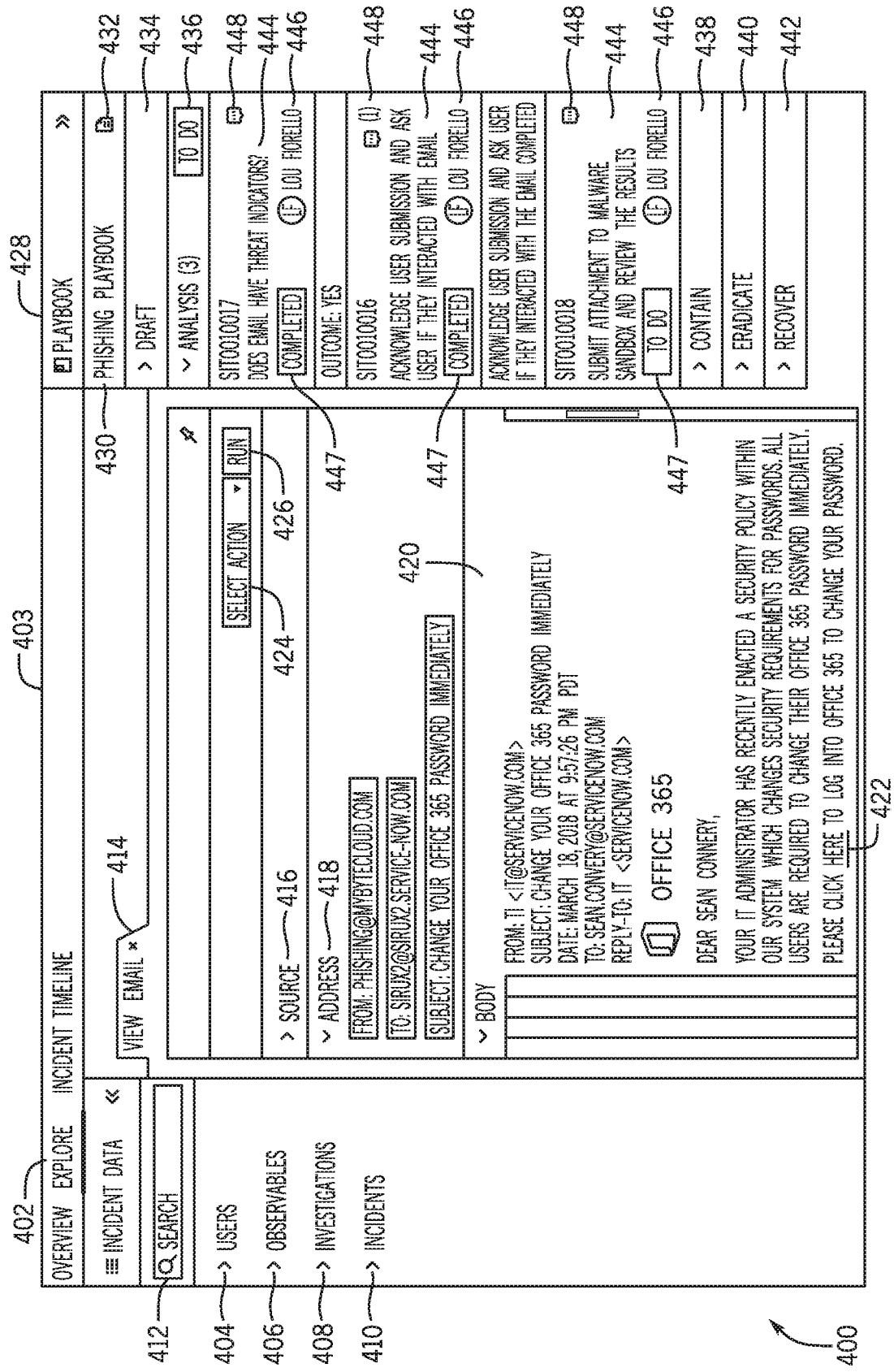
FIG. 5 is a screen of a phishing attempt search interface when a notification of a suspicious message has been received, in accordance with aspects of the present disclosure.

FIG. 5 illustrates an embodiment of a screen 400 of a phishing attempt search interface. As illustrated, the screen 400 may include a menu 402 that may be used to navigate the phishing attempt search interface by causing corresponding information to be displayed in a pane 403. Specifically, the menu 402 may include a users item 404 that may be used to view/edit user entries indicating that users have been targeted by phishing attempts or have been victimized by a phishing attempt. The menu 502 may further include an observables item 406 that may be used to view observable parameters that may be indicative of a possibility or a success of a phishing attack. For instance, the observable parameters may include interactions with messages with threat indicator objects (e.g., URL, IP address, email message ID, domain name, file (e.g., using a hash of the file), and/or other identifying information) in a suspicious/malignant message. For instance, the objects themselves (e.g., file or URL) may be malignant and/or may be used to identify any messages that might be associated with a phishing attempt. The computing system 10 (e.g., via the virtual server 300 of the client instance 102) may flag suspicious objects as observables. Additionally or alternatively, the computing system 10 may receive an indication from a user (e.g., security analyst) that a particular object is associated with potential phishing attacks.

The menu 402 may also include an investigations item 408 used to view/open investigations in the phishing search interface. Furthermore, the menu 402 may include an incidents item 410 that may be used to view incidents. For instance, the incidents may include prior incidents and/or child incidents occurring from a currently viewed phishing attempt. The menu 402 may also include a search input 412 that may be used to search for items and/or sub-items within the items of the menu 402.

When a message is flagged, a notification may be generated. For instance, the notification may be generated by sending or forwarding the suspect message to a security analyst who may access the message/notification in the phishing attempt search interface. For instance, a scanner node may scan messages (e.g., electronic mail) for potential threat indicators and send such messages to a security management node of the computing system 10. Additionally or alternatively, a user receiving a suspect message may forward the message to specific target address or the user may select a report message button that sends the message to a security analyst for analysis. Upon opening the reported email (e.g., via the investigations item 408), an email tab 414 may open in the pane 403.

The email tab 414 may include a source item 416 that may be selected to provide information about from where the notification originated. For instance, when the notification is auto-generated, the source item 416 may indicate such automatic generation, and when the notification is generated by a user forwarding the message or marking the message as suspicious, the source item 416 may indicate an identity of the user or device on which the user was logged in.

The email tab 414 may also include an address item 418 that may indicate information from headers of the message. For instance, the address item 418 may display information such as the original sender of the message, the original recipients of the message, a subject of the message, and/or other information about the message.

The email tab 414 may also include a body item 420 that may display contents of the message. For instance, the body item 420 indicates the contents of the message including a hyperlink 422 that may link to a harmful location where information (e.g., a password) may be fraudulently sought or obtained, harmful files may be located, and/or other potential harmful effects.

The email tab 414 may also include a select actions button 424 that may be used to select what actions are to be performed on the message. For instance, the select actions button 424 when selected may provide a drop down menu or other selector that may be used to select various available actions. For example, the available actions may include deleting the message from the recipient(s) mailbox(es), marking the message as a threat, verifying that the message (and its potential threat indicators) are legitimate, inputting/identifying threat indicators from the message to identify other potentially harmful messages, starting a search using the threat indicators to find other potential phishing targets and/or victims, and/or other suitable actions. Once the selected action is selected, a run button 426 may be selected to begin the action. Alternatively, the selected action may be initiated without waiting for the run button 426 to be selected.

The screen 400 may also include a playbook 428 that may include context-sensitive steps to be performed. For instance, a title 430 may indicate that the context is specific to the phishing attempt search interface. A button 432 may be used to navigate to other playbook types in the playbook 428. Additionally or alternatively, the button 432 may be used to view and/or print the entire steps for the current context.

The playbook 428 may also include a draft item 434, an analysis item 436, a contain item 438, an eradicate item 440, and a recover item 442. During the analysis of the message, the playbook may present/expand the analysis item 436 to show the steps that have been performed or are to be performed to complete analysis of the message. The analysis item 436, when expanded, may include multiple sub-items 444 that each correspond to a step of the analysis, such as questions to be asked of the user submitting the request or instructions to identify the threat indicators. Each sub-item 444 may include a user to whom the task is assigned or who has completed the assignment. A status item 447 may indicate whether the task has been completed or is to-do (e.g., to-be-completed). Additionally, each sub-item 444 may include a comments button 448 that may be used to enter comments for the sub-item 444 clarifying steps taken, asking questions, and/or generally providing additional information about the step corresponding to the respective sub-item 444.

The contain item 438 may include steps to contain any future potential harmful effects due to the message. For instance, the contain item 438 may include instructions to change the user's password when the user has been successfully phished. The eradication item 440 may include steps to eradicate the message. The recover item 442 may include steps to recover from the damage caused by the message.

Figure 6:
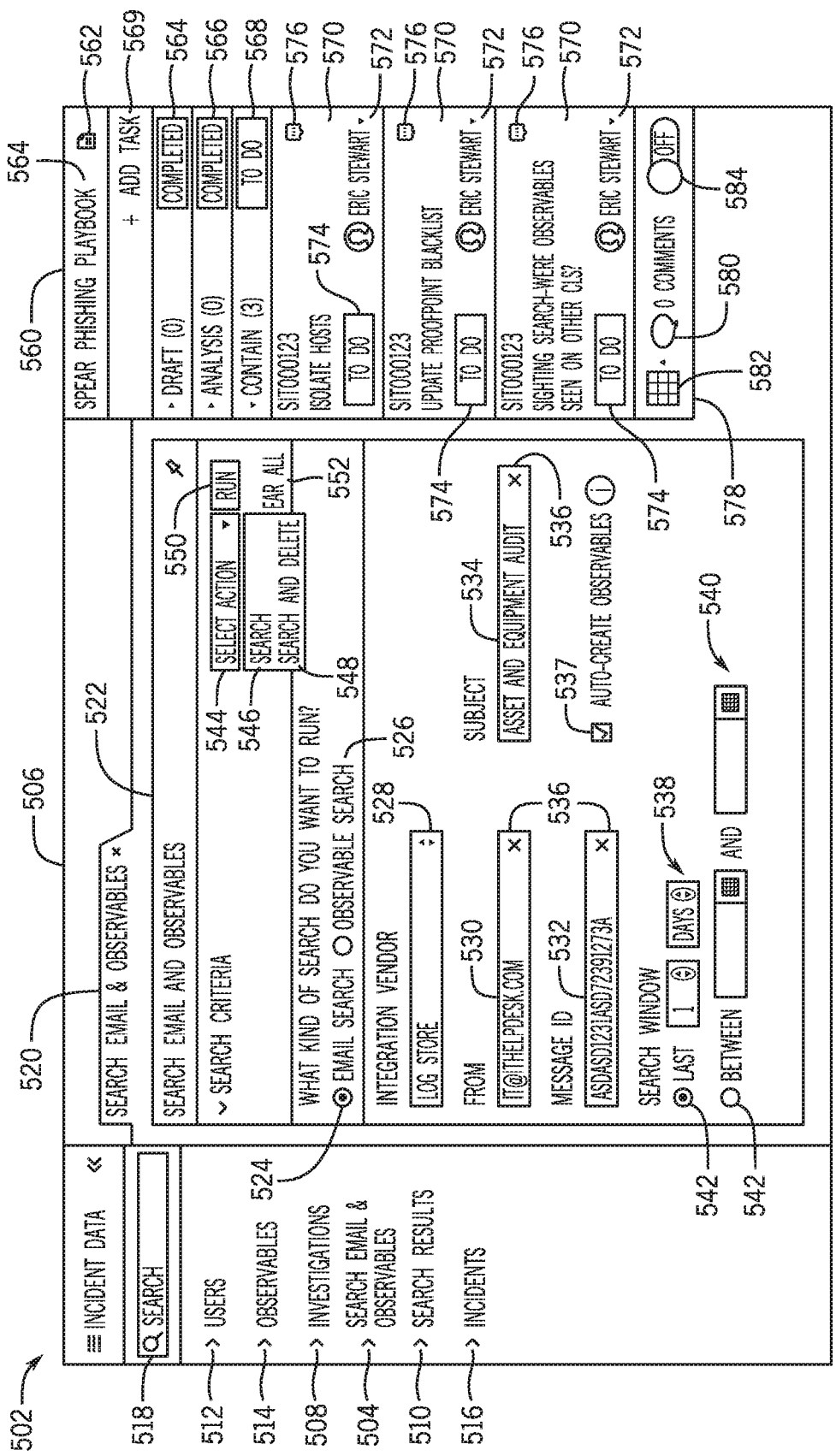
FIG. 6 is a screen of the phishing attempt search interface when an email search option is selected in a menu of the phishing attempt search interface, in accordance with aspects of the present disclosure.

FIG. 6 illustrates an embodiment of a screen 500 that may be used to present a phishing attempt search interface, such as when a search action is selected via the select actions button 424. As illustrated, the screen 500 may include a menu 502 similar to the menu 402 that may be used to navigate the phishing attempt search interface. Specifically, the menu 502 may include a search email and observables item 504 that may be selected to present email and observables search options in pane 506 (i.e., like the pane 403). The search email and observables item 504 may be a sub-item of an investigations item 508 similar to the investigations item 408 and is used to view/open investigations in the phishing attempt search interface. The investigations item 508 may also include a search results item 510 that may be used to display search results in the pane 506.

The menu 502 may also include a users item 512 like the users item 404 that may be used to view/edit user entries indicating that users have been targeted by phishing attempts or have been victimized by a phishing attempt. The menu 502 may further include an observables item 514 like the observables item 406 that may be used to view observable parameters that may be indicative of a possibility or success of a phishing attack. For instance, the observable parameters may include interactions with messages with threat indicator objects (e.g., URL, IP address, email message ID, domain name, file (e.g., using a hash of the file), and/or other identifying information) in a suspicious/malignant message. For instance, the objects themselves (e.g., file or URL) may be malignant themselves and/or may be used to identify any messages that might be associated with a phishing attempt. The computing system 10 (e.g., via the virtual server 300 of the client instance 102) may flag suspicious objects as observables. Additionally or alternatively, the computing system 10 may receive an indication from a user (e.g., security analyst) that a particular object is associated with potential phishing attacks. As previously noted, the observables may be identified by the security analyst discussing with the user whether the user had any interactions with the message. Additionally or alternatively, the observables may be tracked in a SIEM platform or in the client computer (e.g., browser history) that may be searched by the security analyst rather than relying solely on the user recounting any particular interactions.

Furthermore, the menu 502 may include an incidents item 516 link that may be used to view incidents. For instance, the viewable incidents may include prior incidents and/or child incidents occurring from a currently viewed phishing attempt.

When the search email and observables item 504 is selected, a search tab 520 may be opened in the pane 506. The search tab 520 includes a title 522. The search tab 520 also includes search options: email search option 524 and observable search option 526. When, as illustrated, the email search option 524 is selected, the search tab 520 may present search criteria used to search emails for particular parameters. For example, the search tab 520 may provide a search location option 528. The search location option 528 may be used to indicate which locations are searched for the email messages. In the illustrated embodiment of the search tab 520, the search location option 528 indicates that a log store has been selected. The log store may include any location that stores information about communications/incidents into/within/out from the client network 12. For instance, the log store may be included in a SIEM platform/application, such as SPLUNK, ArcSight, Qradar, or any other SIEM applications. For instance, when searching a SIEM log store, the phishing attach search interface may utilize an application programming interface (API) of the SIEM to access the SIEM log store. The search location option 528 may also include searching individual mailboxes of users or other locations where information about received messages may be stored.

The search tab 520 may also present a form input 530, a message ID input 532, and a subject input 534 that each may be used to input respective threat indicators to be searched in the indicated search location in the search location option 528. The form input 530, the message ID input 532, and/or the subject input 534 may be automatically filled from identified threat indicators using the select action button 424. The form input 530, the message ID input 532, and/or the subject input 534 may be populated by a template or saved search that has been generated by a security administrator to enable the security analyst to use pre-created queries. Additionally or alternatively, the form input 530, the message ID input 532, and/or the subject input 534 may enable entry of manual values into the phishing attempt search interface. The search tab 520 may include cancel buttons 536 that may be used to clear out the form input 530, the message ID input 532, and the subject input 534. In some embodiments, a first selection of a cancel button 536 may cause the value in the corresponding input to be cleared, and a second selection of the cancel button 536 may cause the threat indicator input to completely be removed from the search tab 520. The search tab 520 may also include an auto-create observables button 537 to automatically generate observables from the values in the form input 530, the message ID input 532, and/or the subject input 534.

The search tab 520 may also include search windows 538 and 540 that may be selected using a selector 542. The search window 538 may cause a search prior to the current time up to a selected number of minutes, hours, days, weeks, months, years, etc. The search window 538 may cause a search for a window time between two specified periods in time. In some embodiments, the search window 538 or the search window 540 may have a default value (e.g., 3 days prior to current time) that is selected unless changed by the security analyst via the phishing attempt search interface.

Once the search criteria has been entered, the search may be completed using a select action button 544. Using the select action button 544, a search item 546 or a search and delete item 548 may be selected. The search item 546 may merely return search results once a run button 550 is selected. The search and delete item 548, when selected, may return the search results and remove the message and/or the returned messages in the search results. The search tab 520 may include a clear all button 552 that may be used to clear all of the search criteria. In some embodiments, the search operation may be aborted upon selection of the clear all button 552.

In certain embodiments, the search results may be integrated into and/or correlated with a user directory of an instance with the names added to an affected users list. In some embodiments, the SIEM may not store user names or email addresses due to security concerns. However, metadata (e.g., the "to" address of the email message) for the logged messages may be used to acquire the user email address. The output of the search may also be saved. For instance, the stored search results may confirm to a Common Information Model (CIM) and/or may be stored in a raw format, such as comma-separated values or JavaScript Object Notation.

Similar to the playbook 428 in the screen 400, the screen 500 may also include a playbook 560 that may include context-sensitive steps to be performed. For instance, a title 564 may indicate that the context is specific to the phishing attempt search interface. A button 562 may be used to navigate to other playbook types in the playbook 560. Additionally or alternatively, the button 562 may be used to view and/or print the entire steps for the current context.

The playbook 560 may also include a draft item 565, an analysis item 566, a contain item 568, and/or other items each corresponding to various actions to be performed using the phishing attempt search interface. During the analysis of the message, the playbook may present/expand the contain item 568 to show the steps that have been performed or are to be performed to complete containment of the message. The contain item 568, when expanded, may include multiple sub-items 570 that each correspond to a step of the containment, such as isolating hosts, updating a blacklist, changing a user password or instructing the user to change the password (e.g., via an automated alert), blocking an IP or uniform resource locator (URL) in the client's firewall/email gateway/web proxy, searching configuration items of the client network 12, sending an alert to other (e.g., all) users warning of the phishing attempt, and/or other tasks. Each sub-item 570 may include a user 572 (e.g., security analyst) to whom the task is assigned or who has completed the assignment. A status item 574 may indicate whether the task has been completed or is to-do (e.g., to-be-completed). Additionally, each sub-item 570 may include a comments button 576 that may be used to enter comments for the sub-item 570 clarifying steps taken, ask questions, and/or generally providing additional information about the step corresponding to the respective sub-item 570.

The playbook 560 may include a playbook menu 578 that pertains to the entire playbook or to a specific selected sub-item 570. The playbook menu 578 includes a comments button 580 that, when selected, enables the security analyst to enter comments for the search either on the entire search (e.g., the playbook 560) or on the specific selected sub-item 570. The playbook menu 578 may further include playbook hide button 582 that enables the security analyst to hide the playbook 560. The playbook menu 578 may also include a toggle 584 that may be used to disable the playbook 560 stop the search operation, mark a selected sub-item 570 as completed, and/or other similar actions.

Figure 7:
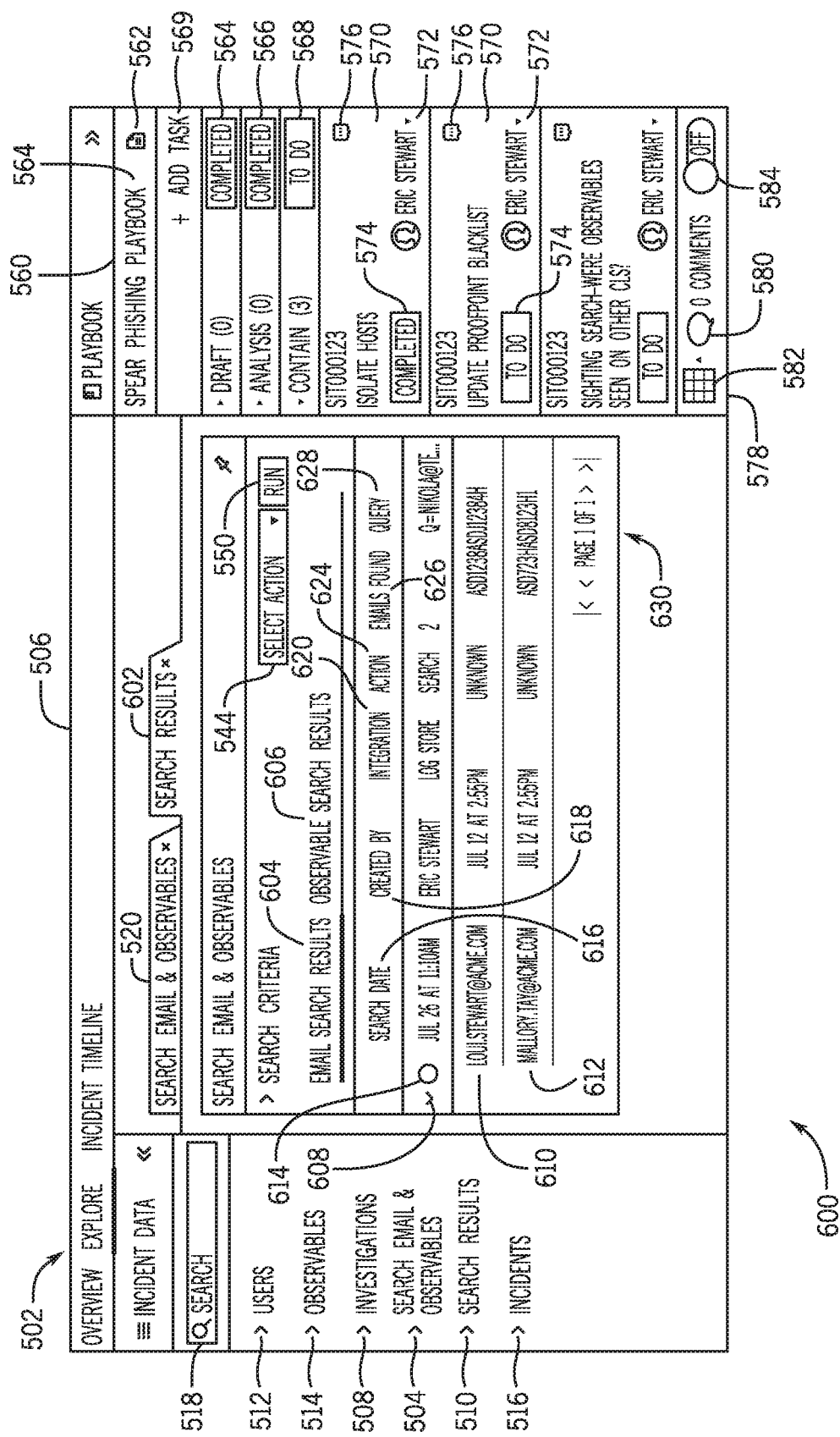
FIG. 7 is a screen of the phishing attempt search interface when an email search is performed in the screen of FIG. 6, in accordance with aspects of the present disclosure.

After a search has been completed, the search results may be returned in the phishing attempt search interface. For example, FIG. 7 illustrates a screen 600 with a search results tab 602 in the phishing attempt search interface. The search results tab 602 includes an email search results tab 604 and an observable search results tab 606. The email search results tab 604 may correspond to results obtained in response to a selection of the email search option 524 in the screen 500 to search for users that have been targeted. The observables search results tab 606 may correspond to results obtained in response to a selection of the observables search option 526 in the screen 500 to search in the targeted users search results to find "victim users" that have interacted with message.

The email search results tab 604 may include a search result entry 608 and child entries 610 and 612 that are related to the search result entry 608. Each search result entry 608 may include a selection button 614 that may be used to select the search result entry 608 to perform the selected actions in the select actions button 544. Each search result entry 608 may include a search date field 616 that led to the result being obtained, a created-by field 618 that invoked the search, an integration field 620 that indicates where the search was performed, an action field 624 that indicates the action performed to acquire the result, an emails found field 626 that indicates how many results (e.g., child incidents) were found in response to the search using the message, and a query ID field 628 for the search. The email search results tab 604 may be used to navigate through one or more pages of search results.

Figure 8:
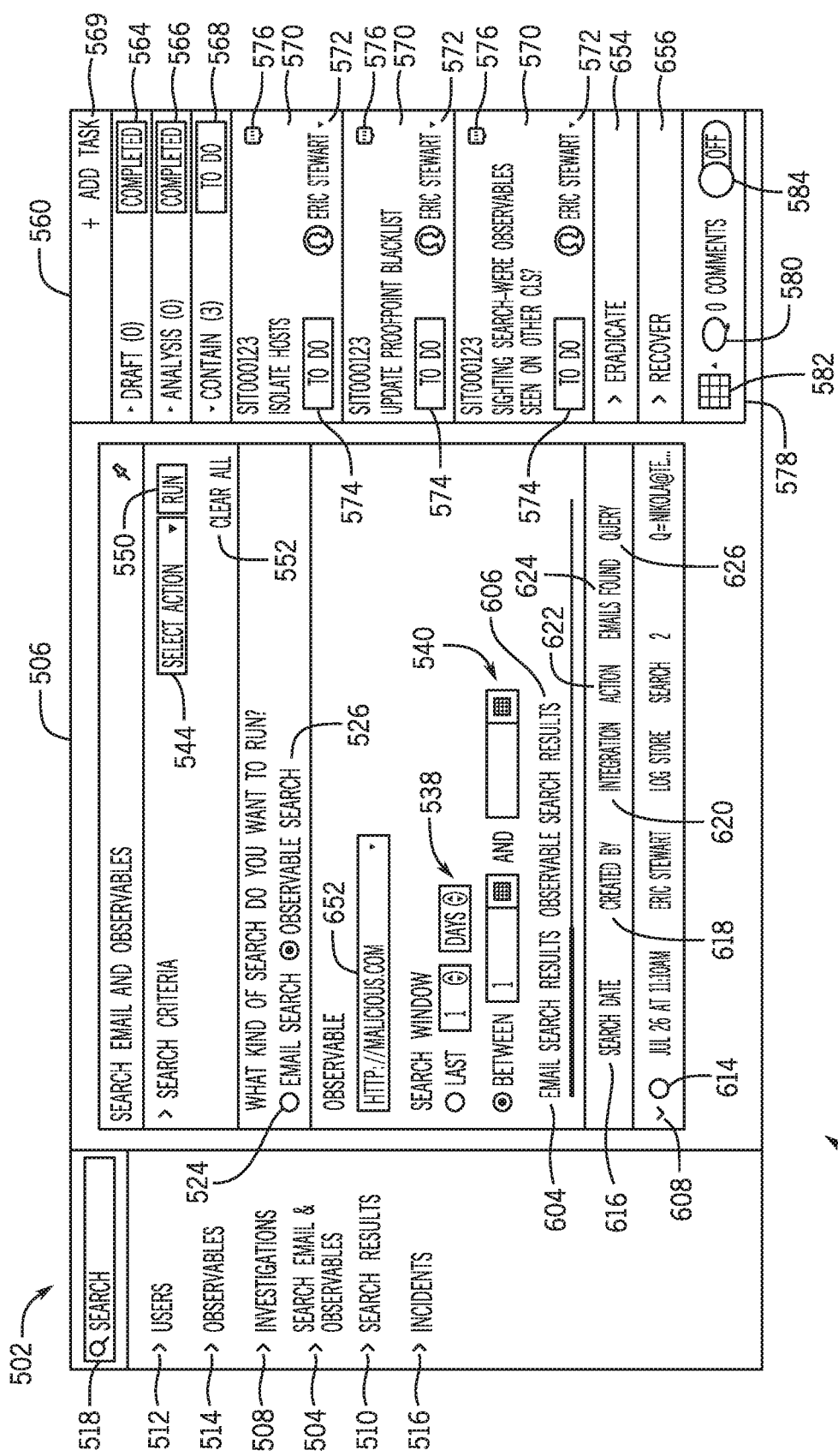
FIG. 8 is a screen of the phishing attempt search interface when an observables search option is selected in a menu of the phishing attempt search interface, in accordance with aspects of the present disclosure.

If the observables search option 526 is selected in the screen 500, a screen 650, as illustrated in FIG. 8, may be presented. The screen 650 includes search criteria for a search of observables presented in the pane 506. The screen 650 includes one or more observable fields 652 that may indicate which observables are to be searched when the run button 550 is selected. As illustrated, the observables search may include selecting one or more search results entries (e.g., the search result entry 608) to determine whether any of the users associated with the message have interacted with related phishing attempt messages. For instance, the observables search may determine whether the user in the incident and/or the users in its child incidents have interacted with identified observables in the message.

FIG. 8 also shows additional steps in the playbook 560 that may have been off-screen in the screen 500. Specifically, the playbook 560 in the screen 650 shows an eradication item 654 and a recover item 656. The eradication item 654 may include steps to eradicate the message. For instance, the eradication item 654 may include steps to delete the email from user mailboxes if the respective users are potentially affected. The recover item 656 may include steps to recover from the damage caused by the message.

Figure 9:
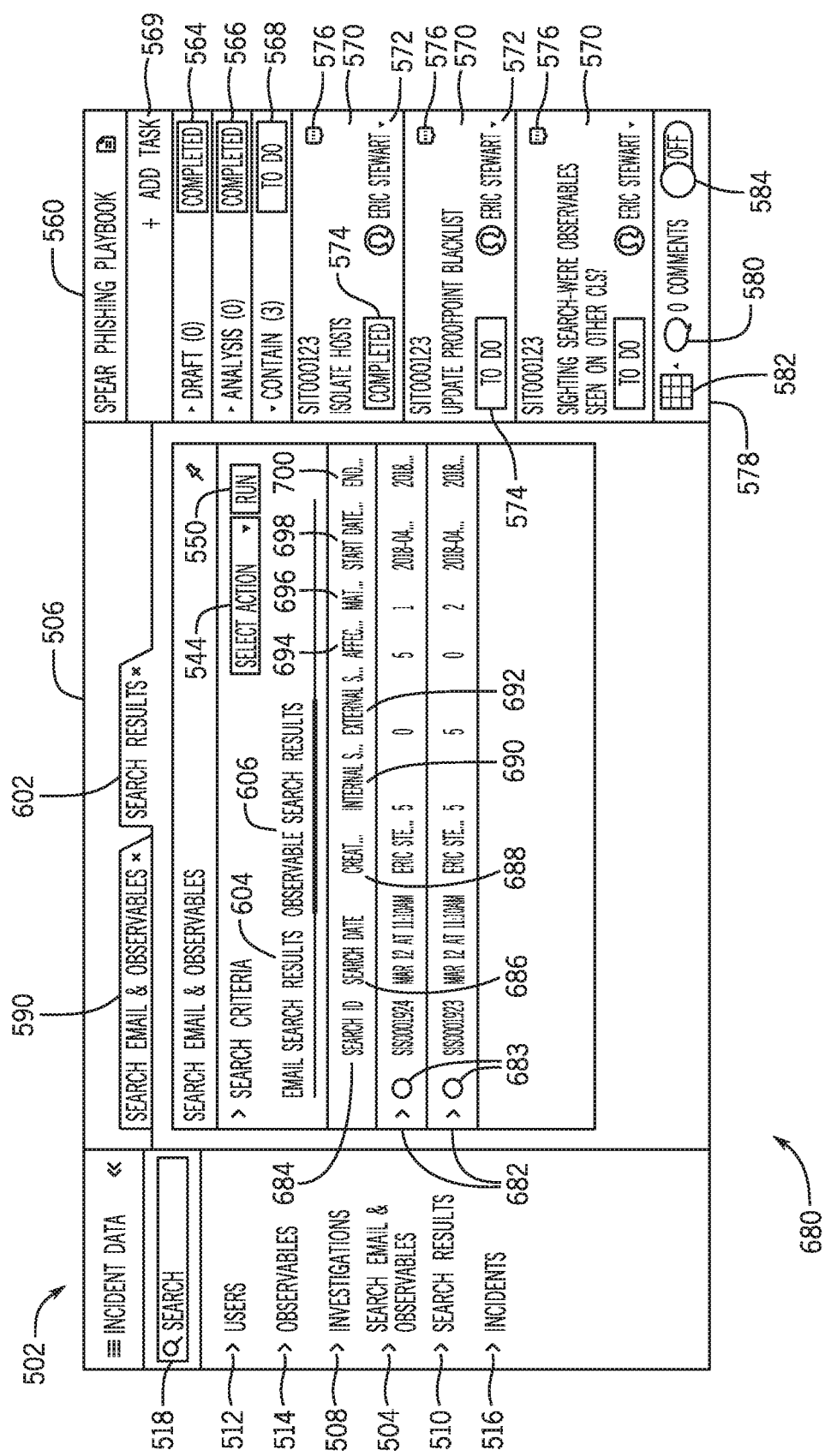
FIG. 9 is a screen of the phishing attempt search interface when an observables search is performed in the screen of FIG. 6, in accordance with aspects of the present disclosure.

FIG. 9 illustrates a screen 680 that reflects a selection of the observable search results tab 606 in the search results tab 602 after an observables search has been completed. The search results may include results entries 682 that may be selected using selection buttons 683. Each result entry 682 may include a search ID field 684 uniquely identifying the search, search data field 686 indicating when the corresponding search was performed, a creator field 688 indicating who initiated the search, an internal field 690 indicating how many internal users are targeted, an external field 692 indicating how many external users are targeted, an affected field 694 indicating how many users have been affected, a match field 696 indicating how many users interacted with the message via the searched observable, a start date field 698 indicating a start for the search, and an end date field 700 indicating an end date for the search.

Figure 10:
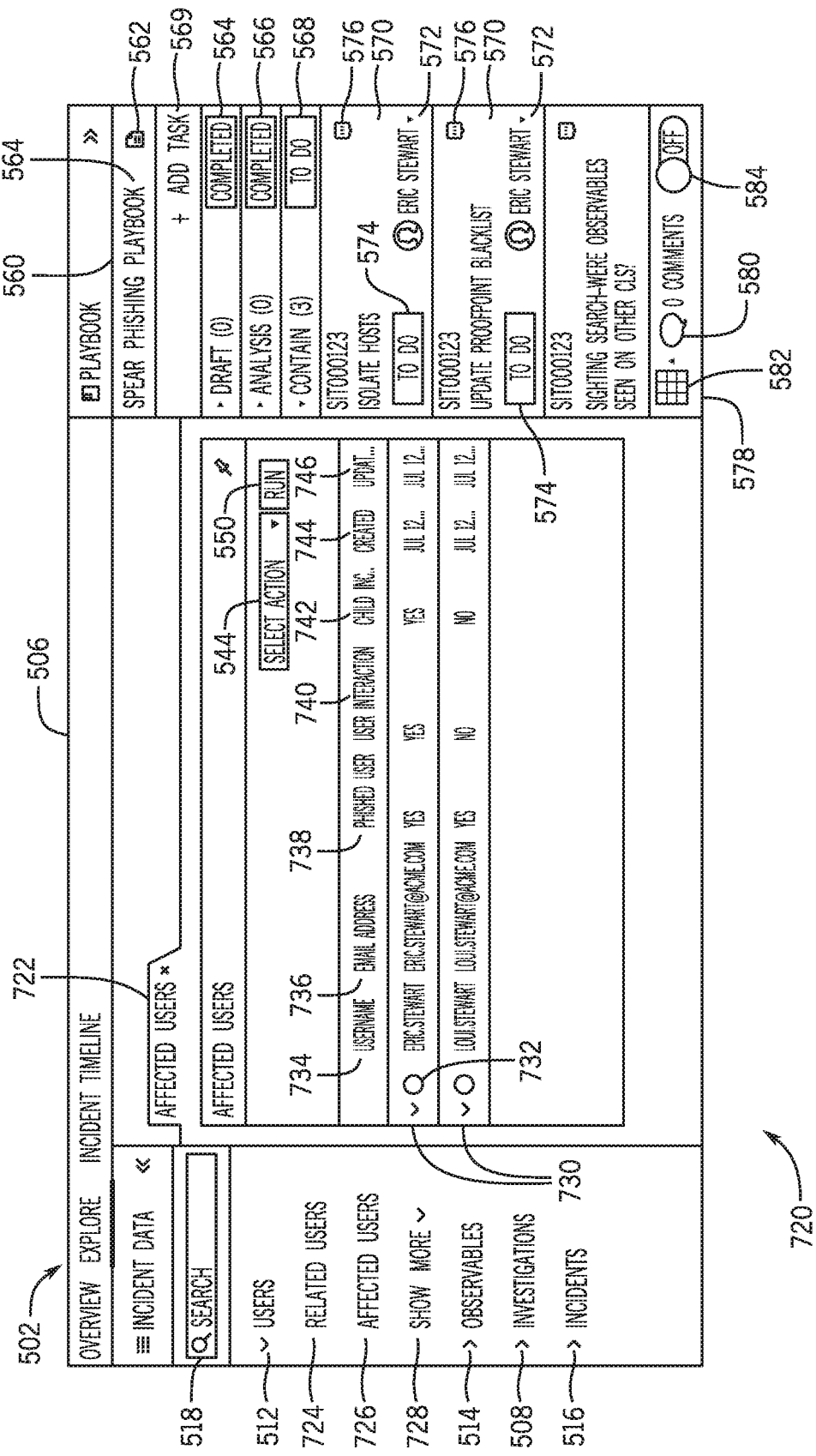
FIG. 10 is a screen that may be presented when an affected users item of the phishing attempt search interface is selected, in accordance with aspects of the present disclosure.

Any users that have been targeted may be added to a list of affected users. Any of the affected users that have been found to have interacted with the phishing attacks may be added to a list of victim users. In some embodiments, the lists of affected users and victim users may be exclusive to each other. In other words, when a user is added to the victim user list, the user is deleted from the affected user list. To view these lists, the users item 512 may be selected in the menu 502. Alternatively, a single list may be stored with indications of whether the user interacted with the message or did not interact with the message. When the users item 512 is selected in the menu 502, a screen 720, as illustrated in FIG. 10, may be presented in the phishing attach search interface. As illustrated, the screen 720 includes an affected users tab 722 that displays a list of affected users. Furthermore, when the users item 512 is selected, the users item 512 may be expanded to show a related users sub-item 724, an affected users sub-item 726, and an option 728 to expand the users item 512 further.

The affected users tab 722 may include a list of user entries 730 that may be selected using selection buttons 732. Upon selection, a selected action in the select actions button 544 may be used to select an action to be performed upon the selected user entries 730. For instance, the user account may be limited (e.g., external email limited, password locked, password changed, etc.) until the phishing attack has been resolved.

Each user entry 730 may also include a username field 734 uniquely identifying the user. For instance, the username field 734 may indicate a login name for the user. The user entry 730 may also include an email address field 736 for the user, a phished indicator field 738 that indicates whether the user was targeted, a user interaction field 740 that indicates whether the user was victimized by interacting with the message, a child incident field 742 that indicates whether the entry has any child incidents associated therewith, a created field 744 that indicates when the entry was created, an update field 746 that indicates when the entry has been updated, and/or other fields of relevant information. In some embodiments, at least one of the fields may remain blank or be omitted from the user entry 730.

Figure 11:
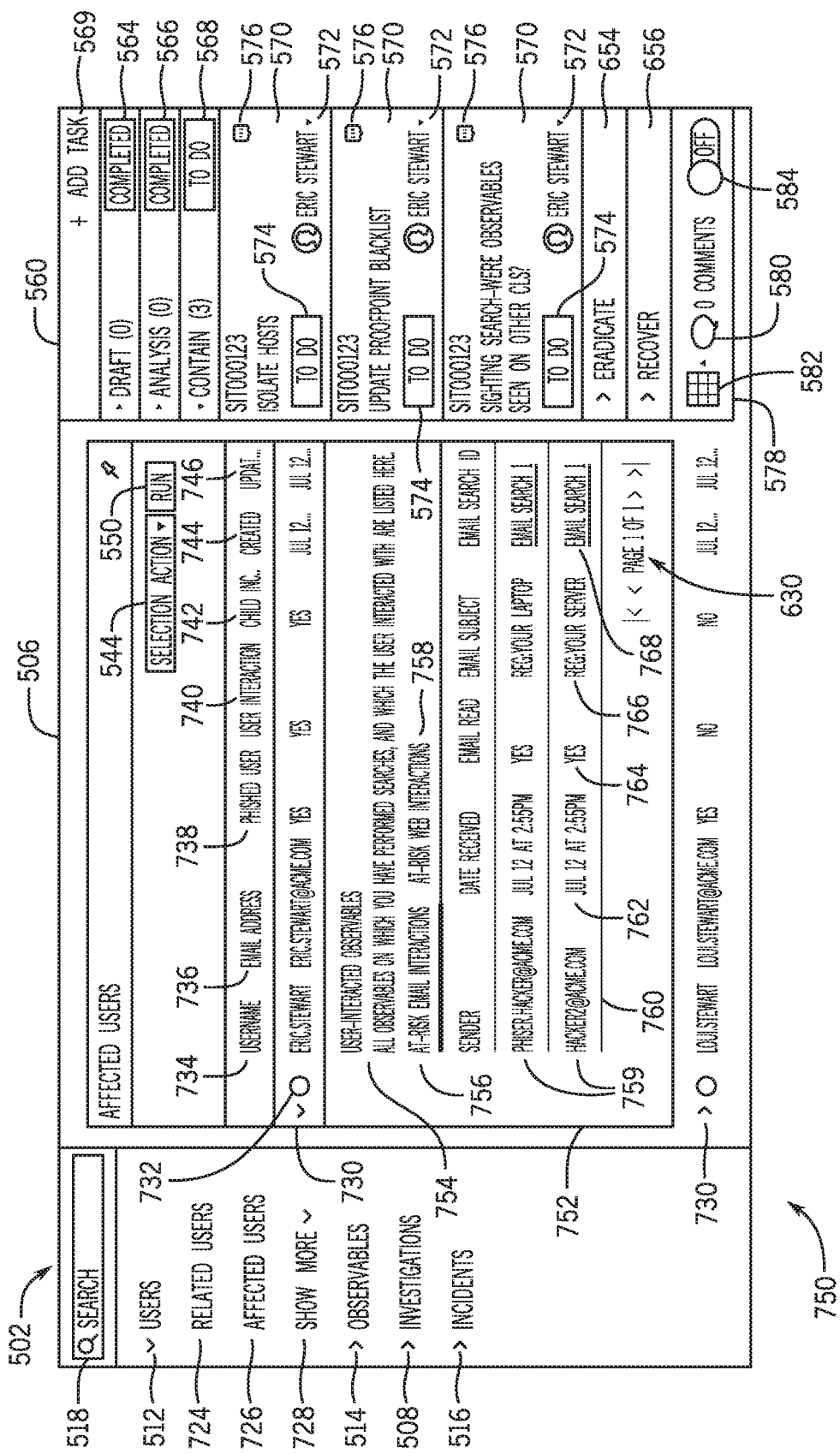
FIG. 11 is a screen that may be presented when a user record of FIG. 10 has been expanded and including an email interactions tab and a web interactions tab, in accordance with aspects of the present disclosure.

In some embodiments, the user entries 730 may be expanded to view additional information about the user entries 730. For instance, a screen 750, as illustrated in FIG. 11, may be presented in the phishing attempt search interface when one of the user entries 730 has been expanded. Specifically, the screen 750 illustrates a details box 752 that is presented in response to expansion of a user entry 730.

The details box 752 includes text 754 describing the contents of the details box 752. The details box 752 may also include an email interactions tab 756 and a web interactions tab 758. The email interactions tab 756 may be used to view identified interactions with an email, and the web interactions tab 758 may be used to view identified interactions through the Internet (e.g., visiting a URL).

The email interactions tab 756 includes a list of interaction entries 759 that provides details of interactions that the user has had with emails that may match the email search and/or observables search. Each interaction entry 759 may include a sender field 760 that indicates a sender of suspect messages with which the user interacted. The interaction entries 759 may also include a date received field 762 that indicates a date that the messages were received. The interaction entries 759 may also include an email read field 764 that indicates whether the user read the email message. The interaction entries 759 may also include an email subject field 766 that indicates a subject for the corresponding email message. Furthermore, the interaction entries 759 may also include an email search identifier 768 that identifies the email search that obtained the results.

Figure 12:
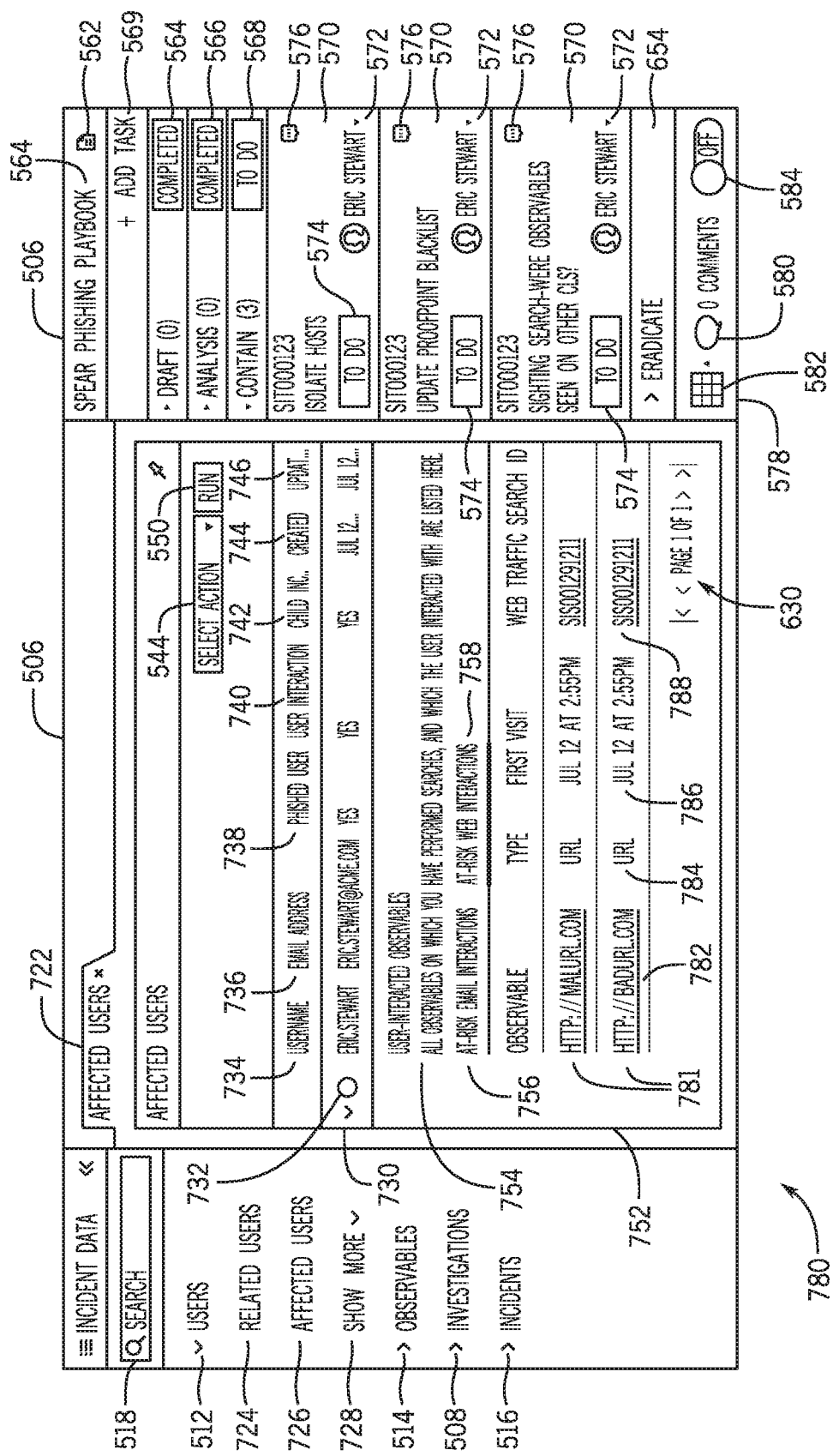
FIG. 12 is a screen that may be presented when the web interactions tab of FIG. 11 has been selected, in accordance with aspects of the present disclosure.

If the web interactions tab 758 is selected, a screen 780, as illustrated in FIG. 12, may be presented in the phishing attempt search interface. As illustrated, the web interactions tab 758 includes a list of interaction entries 781 corresponding to the user's interactions with threat indicators present in the messages used/discovered in the email search. Each interaction entry 781 may include an observable field 782 that may be used to track the interaction. For instance, in the illustrated embodiment, the observable field 782 includes a URL provided in the message. The interaction entries 781 may also include an observable type field 784 indicating a type of observable, such as a URL, domain name, an IP address, a file accessed, and the like. The interaction entries 781 may also include a first visit field 786 indicating when the observable was first visited by the user. In some embodiments, a new entry may be made for each visit to the observable. Alternatively, the interaction entries 781 may have a most recent visit field that is updated based on the most recent visit. Alternatively, the interaction entries 781 may track only a first visit in the first visit field 786. The interaction entries 781 may also include a web traffic search identifier 788 that may be used to index the search (e.g., observables search) that resulted in finding the interaction.

Figure 13:
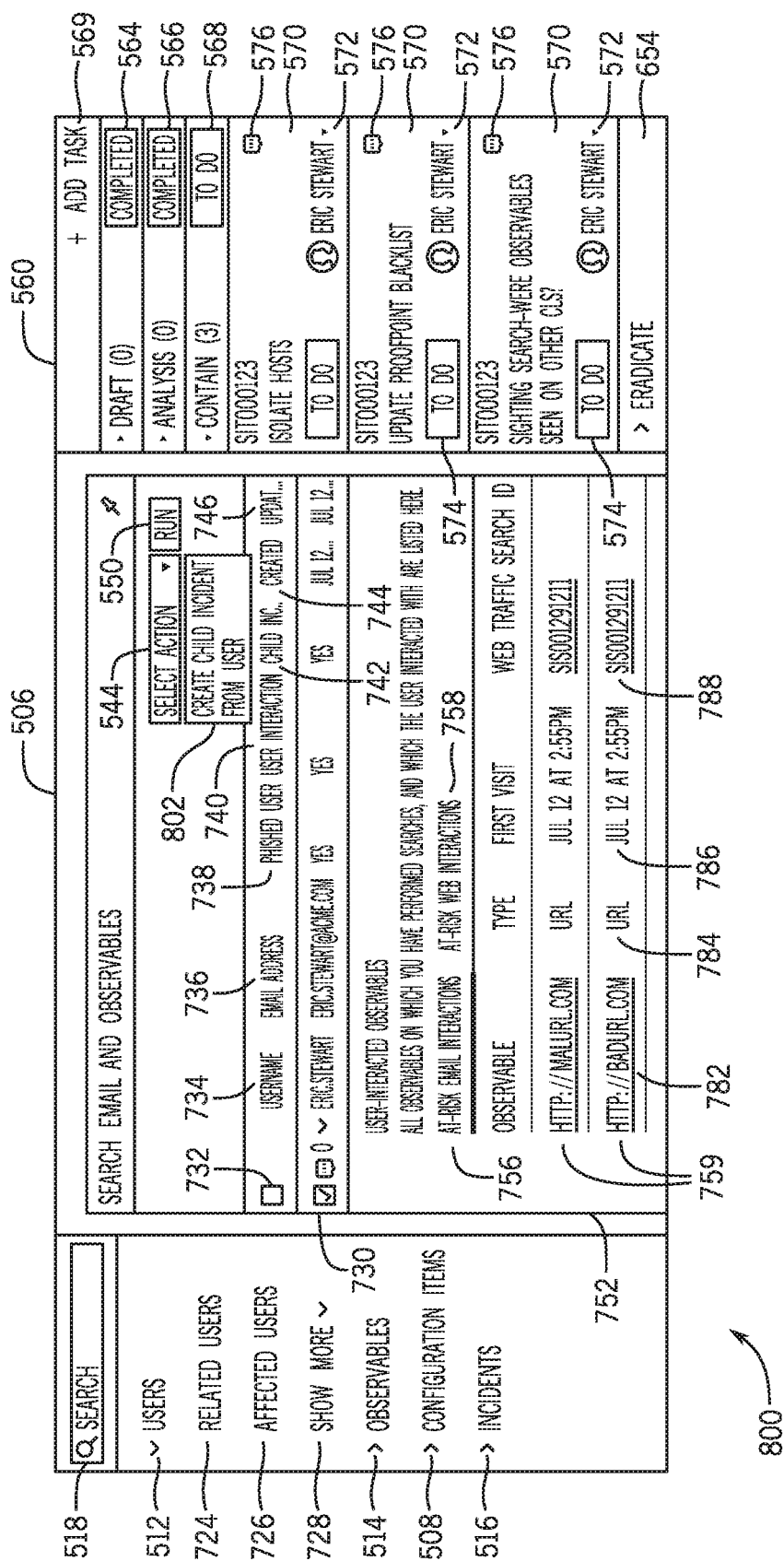
FIG. 13 is a screen that may be presented when one or more user records are selected and an actions select button is selected, in accordance with aspects of the present disclosure.
Figure 14:
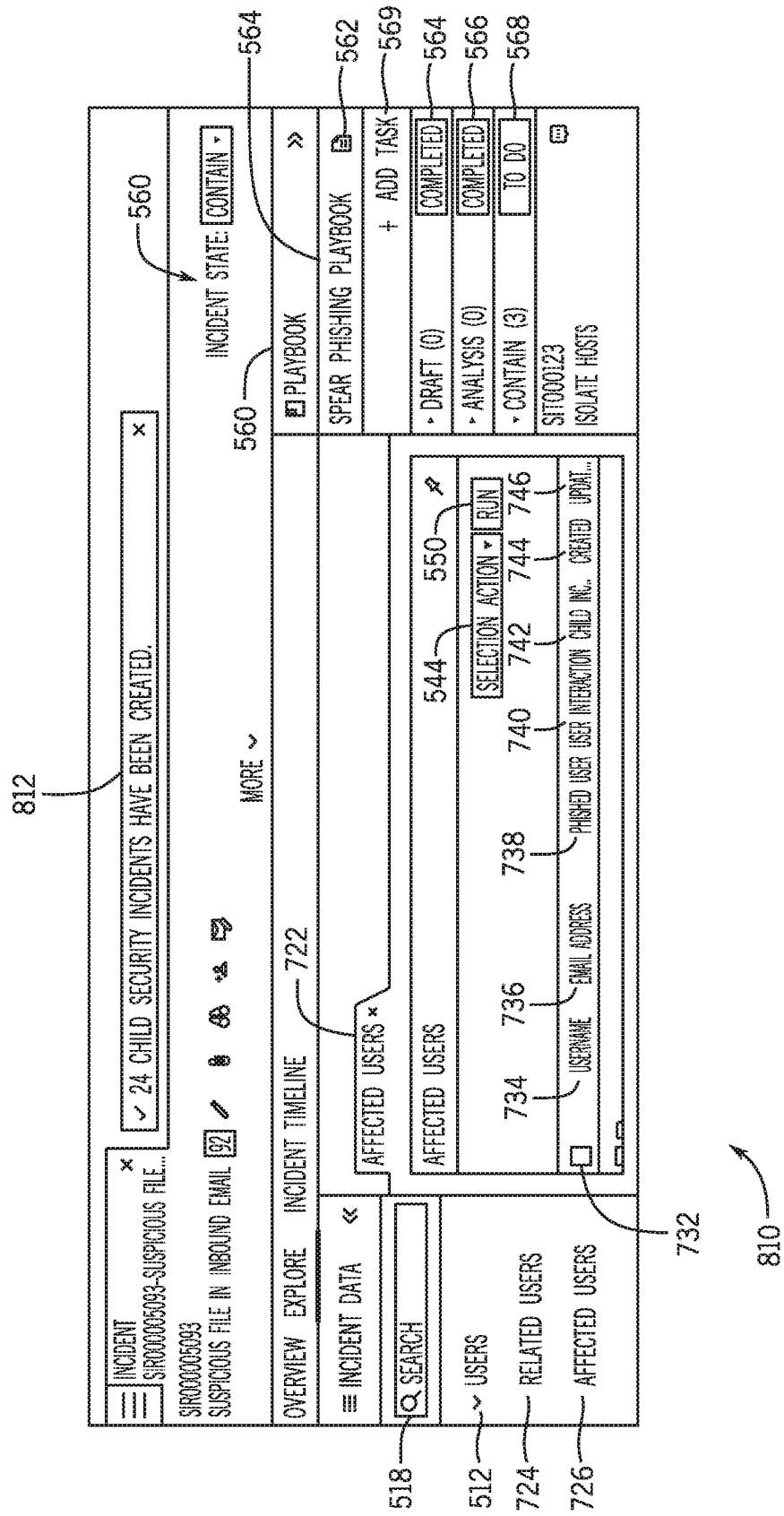
FIG. 14 is a screen that may be presented when a create child incidents option is selected in the actions select button is selected in FIG. 13, in accordance with aspects of the present disclosure.

As previously noted, a phishing message may affect many users, and the security analyst may want to link the user incidents together. The message may be deemed an incident or security incident, and the related affected users discovered from a search based on the message from one user may be all associated together with the related affected users deemed as child incidents of the incident for the one user. Specifically, these incidents may be linked using a selection of an action via the select actions button 544. For instance, FIG. 13 illustrates a screen 800 with a create child incident option 802 that is used to create child incidents from a selected user entry 730 using the selection buttons 732. When the run button 550 is selected while the create child incident option 802 is selected, a status update may be provided in the phishing attempt search interface. For instance, FIG. 14 illustrates a screen 810 that shows a status update 812 provided in the phishing attempt search interface. These connected entries may then be presented in any user entry for the selected user entry 730 used to create the child incidents. In certain embodiments, the child incidents may be generated on a per-user basis where each user record is a unique record with its own potential child incidents.

In some embodiments, a show child incidents option may be selected in the screen 800 that causes the display of a table of child incidents including details about each of the child incidents. For instance, the table may include an identifier for each child incident record, a risk score scoring how likely (e.g., degree of correlation to a known attack) or how severe a danger is posed in the incident, a short description, a category of record, an identifier of a parent incident, a last period of update, and/or other information about the child incident records linked to the user entry 730f.

Figure 15:
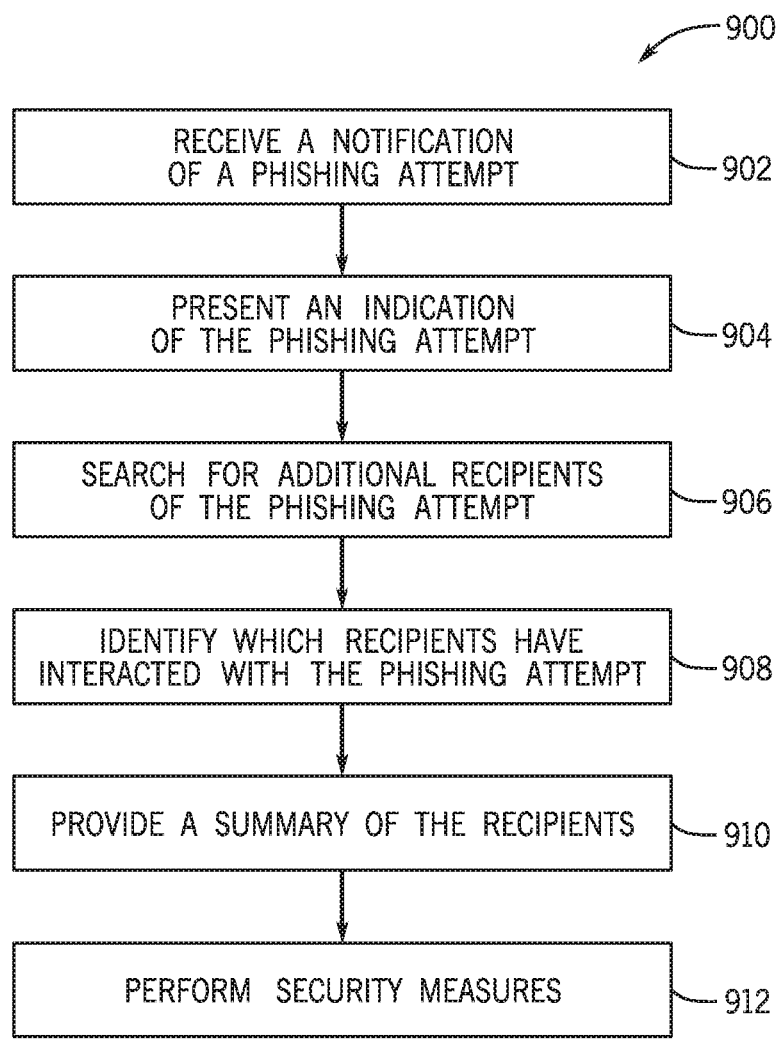
FIG. 15 is a flow diagram of a process that may be employed with the phishing attempt search interface, in accordance with aspects of the present disclosure.

FIG. 15 illustrates a process 900 that may be employed by the computing system 10. The system receives, at a security management node of the system, a notification of a phishing attempt with a parameter associated with a recipient of the phishing attempt (block 902). For instance, a user may receive an email message and forward the email message to the security management node via security management email address. Additionally or alternatively, the user may flag the email message as suspicious in an email client. Additionally or alternatively, a gateway or other device in the computing system 10 may scan incoming messages for interactable objects, such as URLs and attachments. All messages with these interactable objects may be flagged for confirmation by a security analyst or only messages with blacklisted interactable objects (e.g., URLs, filenames, file-hashes, email subject, sender address, etc.) may be flagged for confirmation by a security analyst. In some embodiments, the security analyst, via the phishing attempt search interface, may confirm that one or more objects are suspicious/malignant. Such objects may be identified as a parameter of the notification.

The computing system 10 then presents, via a display, an indication of the phishing attempt in a phishing attempt search interface (block 904). Using the phishing attempt search interface, the computing system 10 searches a log store or email boxes for additional recipients of the phishing attempt based at least in part on the parameter (block 906). The computing system 10, using the phishing attempt search interface, identifies which of the recipient and additional recipients have been successfully targeted by the phishing attempt using an observable interaction with the phishing attempt (block 908). The computing system 10 may also provide a summary of the recipient and the additional recipients as attempted targets (e.g., affected users) or a phished target (e.g., victim users) (block 910). The computing system 10 may also be used to perform security measures in response to the phishing attempt for the attempted targets or the phished targets (block 912). The security measures may be automated and/or security analyst-initiated. When the security analyst initiates the security measures, such measures may be accessed directly in the phishing attempt search interface or may be accessed through other Sec Ops applications but with directions to perform the action in the phishing attempt search interface (e.g., playbook 560). The security measures may include containing the phishing attempt, eradicating one or more messages corresponding to the phishing attempt, or restoring damage performed by the phishing attempt. Moreover, the computing system 10 may contain the phishing attempt by isolating host devices, updating a blacklist, changing a user password or instructing the user to change the password, blocking an IP or URL in the client's firewall/email gateway/web proxy, and/or sending an alert to non-affected users prophylactically warning of the phishing attempt. The computing system 10 may eradicate the one or more messages by deleting the one or more messages from user mailboxes of attempted targets or the phished targets.

Categorization/Aggregation of Phishing Incidents

In some instances, multiple submissions of particular phishing attacks may be submitted from more than one source. It may be beneficial to categorize submissions based upon certain criteria, creating consolidated incidents for Security Operations Center (SOC) personal to address. This may reduce the number of incidents associated with a common phishing attack and may also help to prioritize the urgency of a particular phishing attack. For example, phishing attacks that may be aggressive (e.g., as indicated by a high number of consolidated submissions) may be dynamically prioritized over lower-level phishing attack (e.g., those with a lower number of consolidated submissions). The following figures illustrate systems and techniques for categorizing and consolidating phishing submissions.

Figure 16:
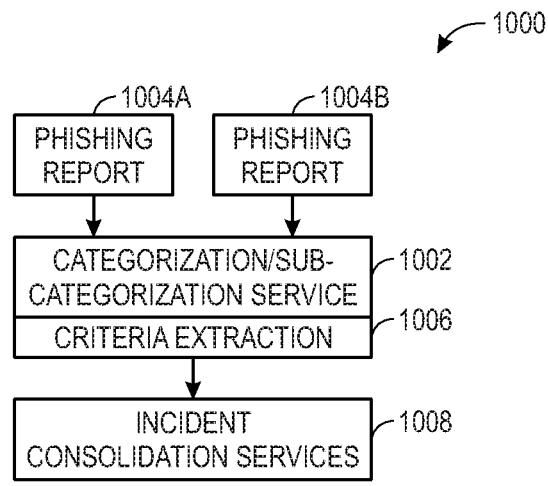
FIG. 16 is a schematic diagram of system for categorizing and consolidating phishing submissions, in accordance with aspects of the present disclosure.

FIG. 16 is a schematic diagram of system 1000 for categorizing and consolidating phishing submissions, in accordance with aspects of the present disclosure. The system 1000 includes categorization/sub-categorization services 1002 that extract criteria of a set of phishing reports (e.g., phishing report 1004A and phishing report 1004B) using criteria extraction operations 1006. For example, as will be discussed in more detail below, criteria such as: the sender's IP address, sender's email address, the email subject, text contained in the body of the email, a phishing URL found in the email, etc. may be used to categorize a phishing attempt. This information can be extracted from received submissions to identify commonalities between the phishing reports (e.g., phishing report 1004A and 1004B).

Additionally, incident consolidation services 1008 may be used to consolidate multiple phishing reports that relate to a common phishing attack into a single incident, such that the SOC is not inundated with top-level incidents associated with a common phishing attack. This may help in prioritizing remediation efforts by the SOC.

Figure 17:
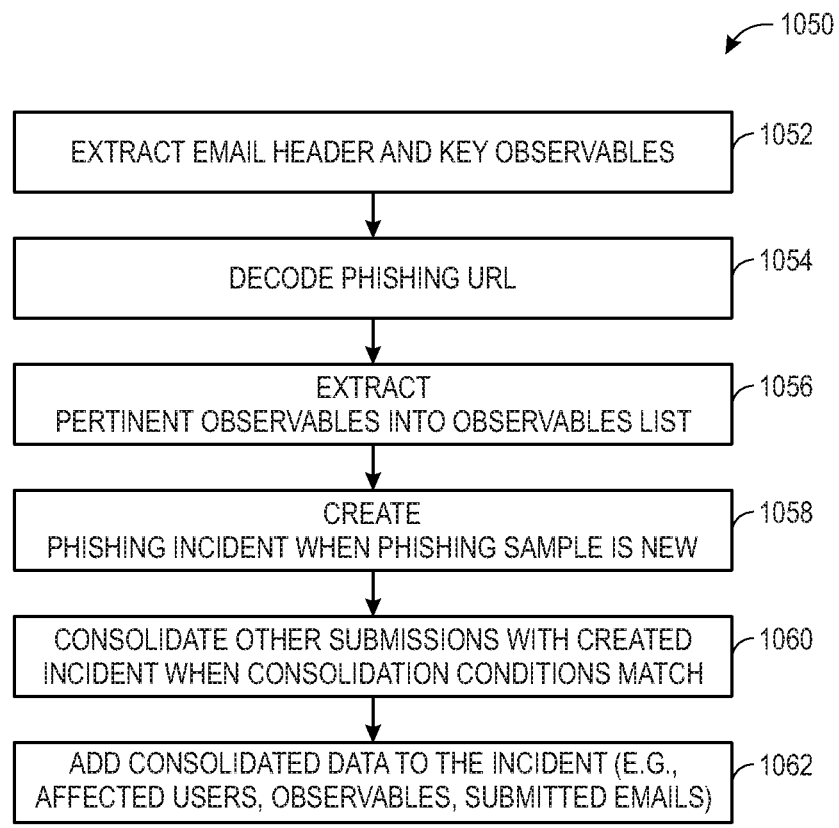
FIG. 17 is a flow diagram of a process for categorizing and consolidating a phishing submission, in accordance with aspects of the present disclosure.

FIG. 17 is a flow diagram of a process 1050 for categorizing and consolidating a phishing submission, in accordance with aspects of the present disclosure. First, email headers and key observables are extracted from the emails submitted in a phishing report submission (block 1052). For example, a file name of an attachment provided in the email may be extracted, a domain name provided in the phishing URL of the email may be extracted, etc.

In instances where the phishing URL is encoded (e.g., by using an abbreviated URL and/or by a secure email gateway, such as Proofpoint), the phishing URL may be decoded (block 1054). For example, a decoded email may be generated by using the services that encoded the URL.

Pertinent observables are extracted into an observables list that provides a list of observables with regard to the phishing email provided with the phishing report submission (block 1056). For example, as mentioned above, an email address of the sender, an email subject, a file attachment name, a file hash, an originating IP address, etc. may be extracted and placed in the observables list. The pertinent observables may be identified based upon criteria that may be used to categorize/aggregate phishing submission reports.

When the pertinent observables (e.g., the phishing sample) indicates a new incident (e.g., one that is not currently active), a new phishing incident may be created (block 1058). For example, if a rule is set up to generate an incident when the sender is phisher@phisher.com and the subject contains "Invoice: Inveesion" and no such incident has yet been generated, a new incident may be generated.

FIG. 18 is a graphical user interface (GUI) 2000 that illustrates categorization/consolidation criteria for a new incoming phishing submission that results in a new incident generation, in accordance with aspects of the present disclosure. As illustrated, GUI 2000 provides the conditions/ingestion criteria 2002 (e.g., sender is phisher@phisher.com and the subject contains "Invoice: Inveesion") to result in a rule outcome 2004 (e.g., creating an incident). Additional conditions can be added to the conditions 2002 by selecting the "Add filter condition" option 2006. Further, alternative conditions may be added by selecting the "Add 'OR' Clause" option 2008.

While the current rule outcome 2004 is set to create incident, the rule outcome 2004 could be one of a number of options. For example, an alternative option could be to create an alert, which would result in a notification of the criteria matching in a phishing submission, but would not result in an incident record being generated based upon the match.

Phishing campaigns may include phishing simulations that are provided in the system. As may be appreciated, workflow changes may be implemented for simulations. Accordingly, one benefit of the current techniques is that certain expected phishing simulations may be dynamically categorized based upon particular criteria and a different workflow may be implemented. For example, for a simulation, it may be desirable not to generate an incident, even for the first ingestion match. Accordingly, the rule outcome can be set to not generate a new incident.

A rule specifying these conditions 2002 and rule outcome 2004, otherwise known as an ingestion rule, may be saved. Accordingly, a rule name field 2010 may be provided to allow the user to indicate a name for the ingestion rule (e.g., here, "Winter Phishing Campaign").

An active option 2012 is adjustable to indicate whether the current ingestion rule is active. When active, received phishing report submissions are compared to find matches to the condition 2002. When a match occurs, the rule outcome 2004 is implemented.

The incident template option 2014 may enable the user to specify a particular incident template to use for the incident generation. For example, here the "Wombat Incident Template" is selected and incident parameters associated with this template are used to generate the incident. For example, such parameters may include a category assignment, a sub-category assignment, a business impact, a priority, an assignment group, or other incident variables.

As will be discussed in more detail below, ingestion rules may be prioritized, enabling certain of the ingestion rules to occur before other of the ingestion rules. The order option 2016 enables such prioritization. In one embodiment, when a phishing report submission triggers a rule outcome based upon matched conditions 2002 in a higher-prioritized ingestion rule, lower-priority rule outcomes are not triggered, even when there is a match in conditions with the lower-priority rule. In other embodiments, rule outcomes for both the higher and the lower priority rules may be triggered in the prioritized order based upon the match in conditions of both rules.

Returning to FIG. 17, when submissions are associated with previously created incidents, the submission may be consolidated with the previous submissions (block 1060). For example, the newly received submission may be consolidated with a previously generated incident (e.g., one generated in block 1058) by creating a child incident under the previously generated incident or by adding aggregated data to the previously generated incident. Further, consolidated data may be added to the previously generated incident (block 1062).

FIG. 19 is a graphical user interface (GUI) 2050 that illustrates consolidation criteria for incoming phishing submissions that match a previously created incident, in accordance with aspects of the present disclosure. The GUI 2050 generates an aggregation rule that may be used to identify phishing submissions that should be associated with a generated incident that corresponds to the aggregation rule. For example, as illustrated in the current example, the conditions 2052 are similar to those conditions 2002 of FIG. 18 that were used to generate an incident. Thus, upon activation of this aggregation rule, new phishing report submissions that come in with criteria that matches conditions 2052 will be consolidated/aggregated with the incident associated with the activated aggregation rule. As illustrated, the rule outcome 2054 is set to "Create Child Incident", which as may be appreciated, results in a child incident being associated with a parent incident (e.g., the incident associated with the aggregation rule). Selecting the option to create a child incident, in some embodiments, may roll up delta data from the child incident to the parent incident. This may help keep the parent incident "fresh" as parameters of the incident change.

As with the ingestion rule described above, the aggregation rules may include a rule name that is inputted in the rule name field 2056 (here "Winter Phishing Campaign"), a prioritization order, as selected by the order input 2058, and may also form an incident based upon an incident template selected via the incident template option 2060. As mentioned above, the incident template may specify incident parameters, such as category, sub-category, business impact, priority, assignment group, etc.

FIG. 20 is a graphical user interface (GUI) 3000 that illustrates a set of prioritized aggregation rules for received phishing submissions, in accordance with aspects of the present disclosure. As mentioned herein, a number of aggregation rules may be generated for a number of different criteria. The GUI 3000 includes a set of aggregation rules 3002 prioritized based upon order 3004. An indication 3006 of an active status is provided, which indicates whether each of the aggregation rules is currently active (e.g., aggregating phishing reporting submissions with other submissions/parent incidents). As illustrated in the example of FIG. 20, the "Winter Phishing Campaign" is a relative top priority in the aggregation rules 3002. Further, the Summer Phishing Campaign aggregation rule is a relative low priority in the aggregation rules 3002. Further, the indication 3006 indicates that all of the aggregation rules 3002 are active, with the exception of the Summer Phishing Campaign aggregation rule. As mentioned above, the prioritized ordering may help ensure that submission aggregation is prioritized to particular incidents (e.g., relatively higher priority incidents) over other incidents (e.g., relatively lower priority incidents).

FIG. 21 is an incident view graphical user interface (GUI) 3050 that illustrates a consolidated set of phishing submissions that are consolidated into a single incident, in accordance with aspects of the present disclosure. As illustrated by the identification number indicator 3052, incident number SIR0001106 is opened in incident view GUI 3050. Parameters associated with the open incident are also displayed in the incident view GUI 3050. For example, a configuration item (CI) 3054 associated with the incident is indicated, a priority 3056 of the incident is indicated, a business impact 3058 is indicated, an email attachment indication 3060 is indicated, a category 3062 (e.g. "Phishing") is indicated, a sub-category 3064 (e.g. "Simulated Phishing") is indicated, a risk score 3066 is indicated, an assignment identifier 3068 is indicated, and a short description 3070 is indicated.

An accumulation section 3072 is also provided in the incident view GUI 3050. The accumulation section 3072 illustrates details of the accumulated phishing report submissions that have been accumulated with the open incident. For example, the phishing email tab 3074 provides a record/link to each of the emails that were submitted with the accumulated phishing reporting submissions. The affected users tab 3076 provides an indication of each of the affected users aggregated with the open incident. Here, because 3 unique users provided a phishing report submission, each of these users is listed in the affected users tab 3076. The observables tab 3078 provides an observables list of pertinent observables of the accumulated list of phishing reporting submissions, as discussed above. As may be appreciated, the accumulation section 3072 provides an accumulated view of phishing submission reporting details that may enable rapid response and remediation to phishing attacks.

Figure 22:
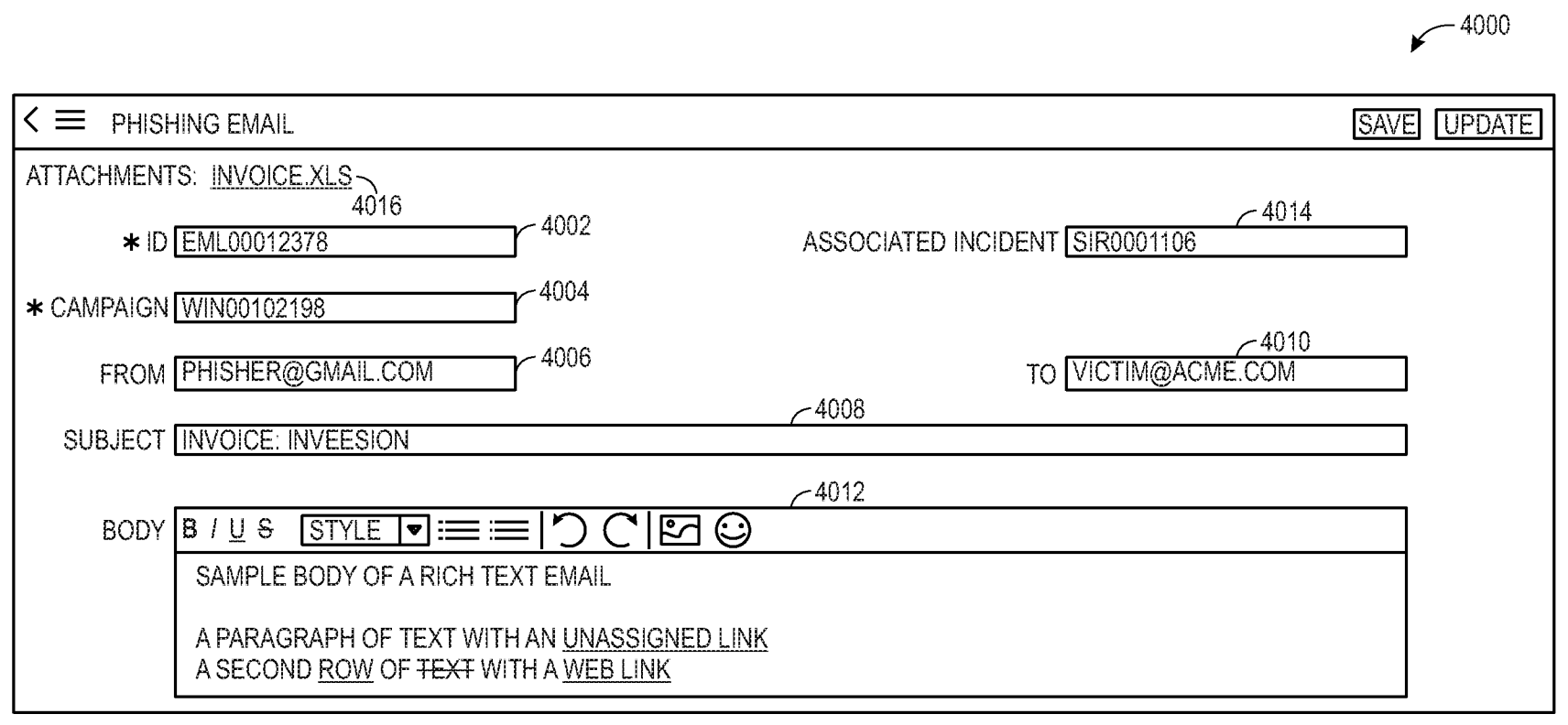

FIGS. 22 and 23 are email deep-dive graphical user interfaces (GUIs) 4000 and 4050 that provide e-mail details associated with the phishing attempt, in accordance with aspects of the present disclosure. Starting first with FIG. 22, the GUI 4000 illustrates a Phishing email detail view that provides: an identifier 4002 of the email submitted with the Phishing report submission, a campaign 4004 (e.g., categorization/aggregation rule) that the email falls under, a source email address 4006, a subject of the email 4008, a destination email address 4010, a rich text view of the body of the email 4012, and an associated incident identifier 4014. A link to any attachments 4016 may also be provided, when attachments were present in the email.

Continuing to FIG. 23, a header extraction view GUI 4050 may also be provided. The header extraction view GUI 4050 may provide a header view 4052 that provides the header text of the email in its entirety. Further, an email Header Details section 4054 may provide fields 4056 of extracted data from the header. The extracted data may be presented in a name/value pair, as presented in the header.

For example, the current extracted data includes an x-header item with associated header value, an Authentication Results item with associated header value, and a Received-sender policy framework (SPF) item name with associated header value. As may be appreciated, not all name/value pairs of the header may be populated in the Header Details section 4054. Instead, the list of name/value pairs to extract from the header may be dynamically configurable, such that only pertinent name/value pairs are extracted and displayed.

By utilizing the phishing categorization and aggregation techniques provided herein, phishing response features may be accelerated limiting potential damage from a phishing attack or campaign of phishing attacks. Furthermore, by linking potential related phishing attacks, a phishing campaign may be identified in the phishing attempt search interface. Additionally, the phishing attempt search interface may be used to perform a comprehensive response by reducing detection time by utilizing a common interface to search and access search results/user records. The comprehensive response via the phishing attempt search interface may also reduce a period before response after an attack to perform the security measures.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A tangible, non-transitory machine readable medium, comprising machine-readable instructions that, when executed by one or more processors of a machine, cause the machine to:
   receive a plurality of phishing report submissions, wherein each phishing report submission of the plurality of phishing report submissions comprises respective suspected phishing emails;
   extract, from each suspected phishing email of the respective suspected phishing emails, respective email headers and respective sets of key observables;
   determine, based on a first email header of the respective email headers, a first set of key observables of the respective sets of key observables, or both, whether a first suspected phishing email of the respective suspected phishing emails matches criteria specified by a rule for creation of a new security incident in an incident monitoring system;
   in response to determining that the first suspected phishing email matches the criteria for creation of the new security incident, create the new security incident;
   determine, based on a second email header of the respective email headers, a second set of key observables of the respective sets of key observables, or both, whether a second suspected phishing email matches aggregation criteria specified by an aggregation rule for associating the second suspected phishing email with the new security incident;
   in response to determining that the second suspected phishing email matches the aggregation criteria for associating the second suspected phishing email with the new security incident, consolidate the first set of key observables with the second set of key observables; and
   provide a representation of the new security incident to a display device for display, wherein the representation comprises a consolidated set of key observables associated with the new security incident.

2. The tangible, non-transitory machine-readable medium of claim 1, comprising machine-readable instructions that, when executed by the one or more processors of the machine, cause the machine to:
   provide a rule graphical user interface (GUI), the rule GUI providing selectable options for generating the rule.

3. The tangible, non-transitory machine-readable medium of claim 2, wherein the selectable options comprise a set of selectable rule outcomes for the rule, the selectable rule outcomes comprising: creating an alert and creating an incident.

4. The tangible, non-transitory machine-readable medium of claim 2, wherein the selectable options comprise selectable criteria.

5. The tangible, non-transitory machine-readable medium of claim 4, wherein the selectable criteria comprises: a source email address of the first suspected phishing email, a source email domain of the first suspected phishing email, or any combination thereof.

6. The tangible, non-transitory machine-readable medium of claim 4, wherein the selectable criteria comprises: a submitter identifier associated with the first suspected phishing email, contents of a subject line of the first suspected phishing email, contents of a body of the first suspected phishing email, or any combination thereof.

7. The tangible, non-transitory machine-readable medium of claim 4, wherein the selectable criteria comprises: a file attachment name, a file hash, a source Internet Protocol (IP) address associated with the first suspected phishing email, or any combination thereof.

8. The tangible, non-transitory machine-readable medium of claim 2, wherein the selectable options comprise an option for designating the rule as active or inactive.

9. The tangible, non-transitory machine-readable medium of claim 2, wherein the rule GUI comprises one or more fields for defining a priority order associated with applying the rule with respect to one or more additional rules.

10. The tangible, non-transitory machine-readable medium of claim 1, comprising machine-readable instructions that, when executed by the one or more processors of the machine, cause the machine to:
    provide an aggregation rule graphical user interface (GUI), the aggregation rule GUI providing selectable aggregation options for generating the aggregation rule.

11. The tangible, non-transitory machine-readable medium of claim 10, wherein the selectable aggregation options comprise a set of selectable aggregation rule outcomes for the aggregation rule, the selectable aggregation rule outcomes comprising creating a child incident.

12. The tangible, non-transitory machine-readable medium of claim 10, wherein the selectable aggregation options comprise selectable aggregation criteria.

13. The tangible, non-transitory machine-readable medium of claim 12, wherein the selectable aggregation criteria comprises: a source email address of the first suspected phishing email, a source email domain of the first suspected phishing email, a submitter user identifier associated with the first suspected phishing email, contents of a subject line of the first suspected phishing email, contents of a body of the first suspected phishing email, a source Internet Protocol (IP) address associated with the first suspected phishing email, or any combination thereof.

14. The tangible, non-transitory machine-readable medium of claim 1, wherein providing the representation of the new security incident to the display device comprises providing a representation of an aggregated view graphical user interface (GUI) to the display device, wherein the aggregated view GUI comprises an indication of an association between the new security incident, a first phishing report associated with the first suspected phishing email, and a second phishing report associated with the second suspected phishing email.

15. The tangible, non-transitory machine-readable medium of claim 14, wherein the indication of the association comprises a first indication that the new security incident is a parent incident, a second indication that the first phishing report is associated with a first child incident of the parent incident, and a third indication that the second phishing report is associated with a second child incident of the parent incident.

16. A computer-implemented method, comprising:
receiving, via a computing device, a plurality of phishing report submissions, wherein each phishing report submission of the plurality of phishing report submissions comprises respective suspected phishing emails;
extracting, from each suspected phishing email of the respective suspected phishing emails via the computing device, respective email headers and respective sets of key observables;
determining, via the computing device, based on a first email header of the respective email headers, a first set of key observables of the respective sets of key observables, or both, whether a first suspected phishing email of the respective suspected phishing emails matches criteria specified by a rule for creation of a new security incident in an incident monitoring system;
in response to determining that the first suspected phishing email matches the criteria for creation of the new security incident, creating, via the computing device, the new security incident;
determining, via the computing device, based on a second email header of the respective email headers, a second set of key observables of the respective sets of key observables, or both, whether a second suspected phishing email matches aggregation criteria specified by an aggregation rule for associating the second suspected phishing email with the new security incident;
in response to determining that the second suspected phishing email matches the aggregation criteria for associating the second suspected phishing email with the new security incident, consolidating, via the computing device, the first set of key observables with the second set of key observables; and
providing, via the computing device, a representation of the new security incident to a display device for display, wherein the representation comprises a consolidated set of key observables associated with the new security incident.

17. The computer-implemented method of claim 16, wherein the representation of the new security incident comprises an indication of one or more users affected by the new security incident.

18. The computer-implemented method of claim 16, wherein the representation of the new security incident comprises respective links to the first suspected phishing email and the second suspected phishing email.

19. The computer-implemented method of claim 18, comprising:
receiving input indicative of a selection of a particular link of the respective links to the first suspected phishing email; and
providing an additional representation of information associated with the first suspected phishing email, wherein the information comprises a source email address associated with the first suspected phishing email, a subject associated with the first suspected phishing email, a destination email address associated with the first suspected phishing email, a text body associated with the first suspected phishing email, or a combination thereof.

20. A computer system, comprising:
one or more processors configured to:
receive a plurality of phishing report submissions, wherein each phishing report submission of the plurality of phishing report submissions comprises respective suspected phishing emails;
extract, from each suspected phishing email of the respective suspected phishing emails, respective email headers and respective sets of key observables;
determine, based on a first email header of the respective email headers, a first set of key observables of the respective sets of key observables, or both, whether a first suspected phishing email of the respective suspected phishing emails matches criteria specified by a rule for creation of a new security incident in an incident monitoring system;
in response to determining that the first suspected phishing email matches the criteria for creation of the new security incident, create the new security incident;
determine, based on a second email header of the respective email headers, a second set of key observables of the respective sets of key observables, or both, whether a second suspected phishing email matches aggregation criteria specified by an aggregation rule for associating the second suspected phishing email with the new security incident;
in response to determining that the second suspected phishing email matches the aggregation criteria for associating the second suspected phishing email with the new security incident, consolidate the first set of key observables with the second set of key observables; and
provide a representation of the new security incident to a display device for display, wherein the representation comprises a consolidated set of key observables associated with the new security incident.

* * * * *